US006915908B2

(12) United States Patent
Bergeron

(10) Patent No.: US 6,915,908 B2
(45) Date of Patent: Jul. 12, 2005

(54) METHOD OF DECONTAMINATING SOIL

(75) Inventor: Mario Bergeron, Cap-Rouge (CA)

(73) Assignee: Institut National de la Recherche Scientifique, Ste-Foy (CA)

( * ) Notice: Subject to any disclaimer, the term of this patent is extended or adjusted under 35 U.S.C. 154(b) by 0 days.

(21) Appl. No.: 10/443,866

(22) Filed: May 23, 2003

(65) Prior Publication Data
US 2004/0082828 A1 Apr. 29, 2004

Related U.S. Application Data

(63) Continuation-in-part of application No. 10/325,536, filed on Dec. 19, 2002, now abandoned.

(30) Foreign Application Priority Data

May 27, 2002 (CA) .............................................. 2387528
Dec. 18, 2002 (CA) .............................................. 2414648

(51) Int. Cl.$^7$ ............................. B03B 9/02; B03B 9/06; B03D 1/02; B09B 5/00
(52) U.S. Cl. ...................... 209/164; 209/166; 209/12.1; 209/17; 209/426; 209/427; 210/703; 210/221.2; 134/25.1; 134/42
(58) Field of Search ................................ 209/164, 166, 209/12.1, 17, 426, 427; 210/703, 221.2; 134/25.1, 42

(56) References Cited

U.S. PATENT DOCUMENTS 4,923,125 A   5/1990 Bateson et al.
5,006,239 A * 4/1991 Mishra ........................ 210/181
5,268,128 A  12/1993 Lahoda et al.
5,342,449 A   8/1994 Holbein et al.
5,522,510 A * 6/1996 Luttrell et al. .............. 209/170
5,829,691 A * 11/1998 Gaudin ..................... 241/46.01

FOREIGN PATENT DOCUMENTS

EP            647483 A1 * 4/1995 ............. B09C/1/02

OTHER PUBLICATIONS

Final Report: Pilot Project Report for the Treatment of Contaminate Properties in the City of Montreal; Mar. 31, 1997; Prepared By; Cintec and Alternative Remedial Technologies, Inc. pp. 38–40.

(Continued)

Primary Examiner—Thomas M. Lithgow
(74) Attorney, Agent, or Firm—Ronald S. Kosie; BCF LLP

(57) ABSTRACT

A method for decontaminating soil containing inorganic contaminants having a degree of liberation of at least 60%, comprising the steps of removing from a coarse fraction at least a portion of inorganic contaminants in particulate form contained therein with a jig to produce a treated coarse fraction, removing from an intermediate fraction at least a portion of inorganic contaminants in particulate form contained therein with a separator selected from the group consisting of a spiral and a classifier to produce a treated intermediate fraction, removing from a fine fraction at least a portion of inorganic contaminants in particulate form contained therein with a separator selected from the group consisting of a flotation cell and a multi-gravity separator to produce a treated fine fraction, whereby the combined treated coarse, intermediate and fine fractions are impoverished in inorganic contaminants.

20 Claims, 4 Drawing Sheets

OTHER PUBLICATIONS 4.17 Soil Washing—WK01\RPT:02281012.009\compgde. 417; Oct. 9, 1997—pp. 4–67 to 4–71.

Technologie Tallon/Tallon Technology—F1–04–95 Decontamination/Site Restoration; Technical Fact Sheet, Tallon Environment, Inc. 8 pgs.

Innovative Site Remediation Technology; Soil Washing/Soil Flushing; One of an Eight–Volume Series, Edited by William C. Anderson, P.E., DEE, 1993.

Richter R et al: "Decontamination of soils and building rubble contaminated with PAHS in physico–chemical soil washing plants", Aufbereitungs Technik, Verlag Fuer Aufbereitung Schirmer und zeh. Wiesbaden, DE; vol. 38, No. 4, Apr. 1, 1997, pp. 185–188, 190, 192, 193.

Gossow V et al: Treatment of contaminated soil—The application of soil washing techniques and chemical leaching; Aufbereitungs Technik, Verlag Fuer Aufbereitung Schirmer Und zeh. Wiesbaden, DE; vol. 33, No. 5, May 1, 1992; pp. 248–250, 252–256.

Bodensanierungazentrum IM Saaarland in betrieb genommen; Aufbereitungs Technik, Verlag Fuer Aufbereitung Schirmer und zeh. Wiesbaden, DE; vol. 37, No. 9; Sep. 1, 1996; pp. 460–461.

* cited by examiner

US 6,915,908 B2

METHOD OF DECONTAMINATING SOIL

The present is a continuation-in-part of U.S. patent application Ser. No. 10/325,536 filed on Dec. 19, 2002 now abandoned.

FIELD OF THE INVENTION

The present invention relates to a method of decontaminating soil. More particularly, the present method concerns a method for decontaminating soil not only in the fine fraction of the material but also in intermediate and coarse fractions thereof.

BACKGROUND OF THE INVENTION

In urban area, past industrialisation projects have contaminated the soil in many zones. Some of these zones are highly polluted by mixed contaminants. The terms mixed contaminants refer to two general components: the organic contaminants and the inorganic contaminants. The organic contaminants are usually water-insoluble and adsorbed on the surface of mineral grains or solids. The organic contaminants are often concentrated in the fine grain-size fraction of the material ("fines"). The inorganic contaminants, which include among others: arsenic, copper, mercury, selenium, zinc are found in the soil as: metal complexes adsorbed on the surface of minerals grains, mineral phases carrying the contaminants, metals alloys and metallic debris. According to various literature reviews (US-EPA, 1994; WASTECH, 1993), the inorganic contaminants are also largely confined in the fines. Because many of these polluted zones are currently being redeveloped by estate agency, the contaminated soil must be dealt with. Usually, the contaminated soil is excavated and disposed in a regulated landfill or decontaminated. However, for mixed contaminants, the number of decontamination processes available is limited. The available processes include: vitrification ex situ or in situ, soil washing, stabilisation/solidification and electroremediation (for review, see US-EPA Internet site: www.clu-in.com). With the exception of soil washing and perhaps stabilisation/solidification the applications of these processes are restricted by their high costs.

Many commercial decontamination technologies for mixed contaminants operate on soil washing principles. All of these processes envision the soil contaminants as residing in the fines. Hence, the fines are isolated for the coarse fraction and submitted to different treatments using specially adapted washing fluids and froth flotation to recover contaminants from solids or from the washing solution. The coarse fraction is often treated by attrition scrubbing to remove the adsorbed fines. The latter being redirected to the fines treatment circuit.

In Canada, Tallon Technology, Environment Canada, technological fact sheet F1-04-95, Tallon Technology reports a soil washing process for mixed contaminants where a preliminary straightforward treatment involving washing, separation by particle size and magnetic separation recovers contaminants in the coarse fraction. A hydrometallurgical process treats the fines, rich in contaminants.

According to its final report, Pilot project report for the treatment of contaminated properties in the City of Montreal, CINTEC-ART has operated a soil washing pilot plant targeting the decontamination of soil from the Montreal area. Basically, the sand fraction was submitted to froth flotation while the coarse and fine fractions were separated by screening and hydrocycloning. The coarse fraction was used as backfill while the fines were routed towards a specialised landfill at high cost. The results were not conclusive and the project was eventually abandoned.

U.S. Pat. No. 5,268,128 teaches the treatment of contaminated particulate material were the material is first washed with a suitable contaminant mobilising solution. The coarse fraction, typically larger than 5 mm, is mechanically separated and returned to the site as backfill. The intermediate size fraction is abraded in an attrition scrubber for liberation of the fines. The contaminants dissolved from the particulate matter in the washing solution are adequately precipitated, concentrated and disposed.

U.S. Pat. No. 4,923,125 teaches a process for the purification of soil contaminated solely by organic material. Scrubbing, attrition and classification isolate the slow settling highly contaminated fines. The coarse fraction is treated by froth flotation for the removal of residual organic contaminants.

WASTECH, a U.S. multiorganization cooperative project, has reviewed available soil washing techniques (WASTECH, Soil washing, soil flushing, Innovative site remediation technology, 1993). The process used by Harbauer GMBH of Germany employs blade washers to blast off contaminants from sands and gravel fractions. The contaminants from the fines are then dissolved in the process water by a chemical extraction. The water is later treated by flocculation and coagulation. The U.S. EPA mobile soil washing system (MSWS) consists in a series of screens, hydrocyclones and froth flotation cells that isolate contaminated fines and a clean soil fraction. Waste-Tech Services Inc., has developed a similar technology based on froth flotation. The contaminants are collected in the froth while the cleaned soil is obtained from the flotation underflow. The Deconterra process is more complex. Basically the contaminated soil is separated in three fractions. A fraction smaller than 63 $\mu$m is not treated and routed towards the contaminated concentrate obtained from the process. An intermediate grain-size fraction is decontaminated by froth flotation and a coarse fraction by jigging.

From all of these descriptions, it is apparent that existing technologies are directed to the treatment of fines without or with only preliminary treatments of the coarse fractions.

Investigations of the contaminants distribution versus grain-size fractions in soils of certain areas have shown that the contaminants are not restricted in the fines, they are instead distributed in all grain-size fractions (FIG. 1).

FIG. 1 graphically illustrates the distribution of contaminants in contaminated soil from the site St-Ambroise/St-Paul in the City of Montreal according to grain size. It shows that the contaminants are limited to two main zones in that soil. A first zone below 12 $\mu$m contains 10 to 25% of contaminants. A second zone, corresponding to the grain-size interval from plus 38 $\mu$m to minus 11 mm, includes the prime portion of contaminants. The previously described technologies are not appropriate for treating this heterogeneous soil.

There thus remains a need to develop an effective treatment method for heterogeneous soil where contaminants are dispersed in fines, intermediate and coarse fractions.

It is therefore an object of the present invention to provide an improved method for treating the fines, intermediate and coarse fractions of contaminated soil.

Other objects and further scope of applicability of the present invention will become apparent from the detailed description given hereinafter. It should be understood, however, that this detailed description, while indicating preferred embodiments of the invention, is given by way of illustration only, since various changes and modifications within the scope of the invention will become apparent to those skilled in the art.

SUMMARY OF THE INVENTION

Figure 1:
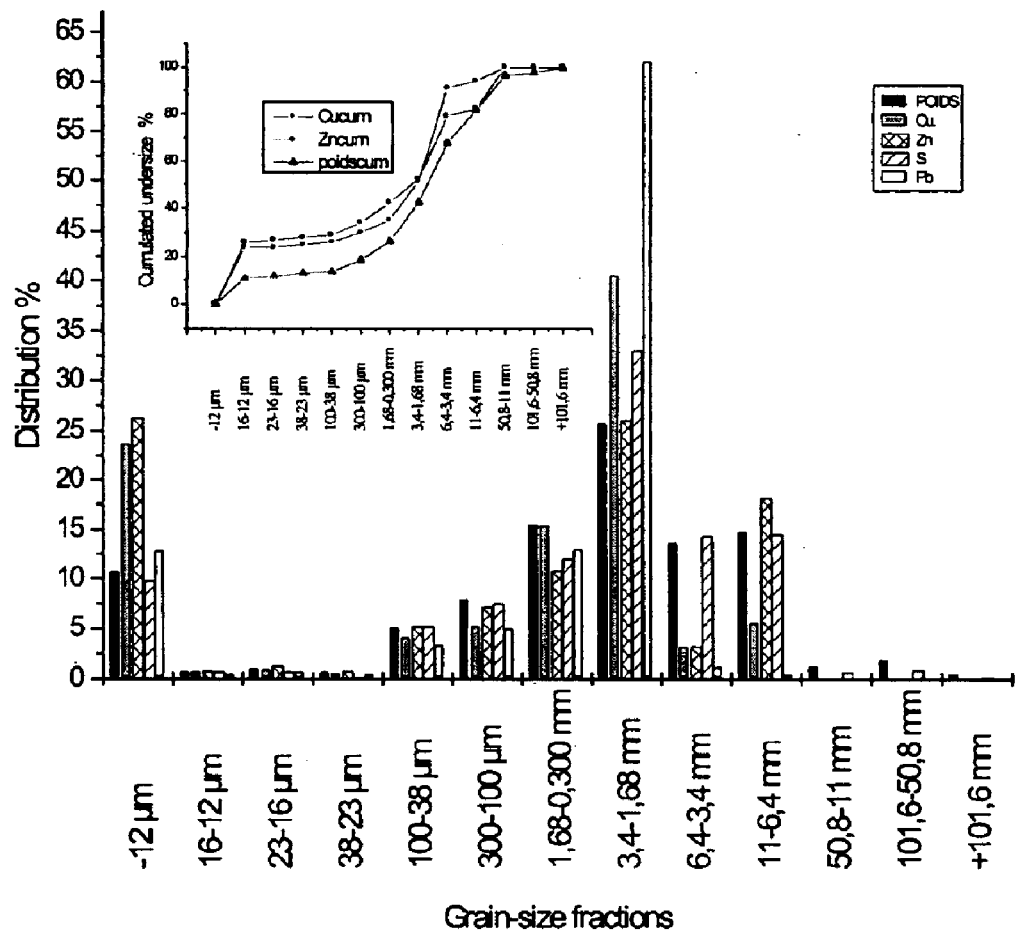
FIG. 1 shows grain-size fractions of contaminated soils from the Montreal region versus distribution of various contaminants (prior art)

The present invention concerns a method for removing inorganic contaminants in particulate form from contaminated soil wherein the inorganic contaminants have a degree of liberation of at least 60%. The present method may decontaminate soil from a contaminated land so that the soil reaches satisfactory inorganic contaminants levels. In particular, MENVIQ environmental norms for soils applicable in the province of Quebec may be reached with the methods of the present invention.

In a specific embodiment, organic contaminants are also removed from the soil so contaminated. In a more specific embodiment, metallurgical characterisation of the soil is performed prior to decontamination in order to reduce the volume of soil subjected to treatment.

According to an embodiment of the present invention, there is provided a method for decontaminating soil containing inorganic contaminants having a degree of liberation of at least 60%, comprising the steps of removing from a coarse fraction at least a portion of inorganic contaminants in particulate form contained therein with a jig to produce a treated coarse fraction, removing from an intermediate fraction at least a portion of inorganic contaminants in particulate form contained therein with a separator selected from the group consisting of a spiral and a classifier to produce a treated intermediate fraction; removing from a fine fraction at least a portion of inorganic contaminants in particulate form contained therein with a separator selected from the group consisting of a flotation cell and a multi-gravity separator to produce a treated fine fraction, whereby the combined treated coarse, intermediate and fine fractions are impoverished in inorganic contaminants. In a specific embodiment, the method may further comprise a step of removing a non-contaminated portion of the coarse fraction. According to other specific embodiments, the coarse fraction may consist essentially in particles having a size within the range 1.7 mm and 6.4 mm, inclusively; the intermediate fraction may consist essentially in particles having a size within the range of 38 µm to 1.7 mm (e.g. within the range of 106 µm to 1.7 mm), inclusively; and the fine fraction may consist essentially in particles having a size equal to or smaller than 106 µm.

According to an other aspect of the present invention, there is provided a method comprising not only inorganic contaminants removal steps as described above but also a step of removing from an organically contaminated portion of the soil at least a portion of the organic contaminants contained therein with an attrition cell. This method is applied when excessive organic contaminants levels are identified in the contaminated soil as defined by the application that is intended for the soil or by applicable environmental norms. In a particular embodiments the steps of removing inorganic contaminants may comprise the sub-steps of identifying the at least one organically contaminated grain-size fraction; b) isolating the at least one contaminated fraction identified in step a); c) washing the at least one contaminated fraction isolated in step b) in an attrition cell, whereby at least a portion of organic contaminants contained therein are solubilised in a liquid phase; d) separating from a solid phase, the liquid phase of step c) containing solubilised organic contaminants; e) flocculating at least a portion of the solubilised organic contaminants to produce a flocculated phase, whereby the solid phase of step d) is soil impoverished in organic contaminants.

In accordance with an aspect the present invention provides a method wherein said coarse fraction has been obtained by
a1) screening the soil to remove a non-contaminated fraction of the soil, wherein said non-contaminated fraction consists essentially in particles larger than those of the coarse fraction; and
b1) screening the undersize from a1) to obtain said coarse fraction, and a coarse fraction undersize; and
wherein said intermediate fraction has been obtained by screening the coarse fraction undersize from b1) to obtain said intermediate fraction and said fine fraction.

According to another aspect the present invention provides a method wherein said coarse fraction has been obtained by
a1) screening the soil to remove a non-contaminated fraction of the soil, wherein said non-contaminated fraction consists essentially in particles larger than those of the coarse fraction; and
b1) screening the undersize from a1) to obtain said coarse fraction, and a coarse fraction undersize;
wherein said intermediate fraction has been obtained by
c1) screening the coarse fraction undersize from b1) to obtain said intermediate fraction, and an intermediate fraction undersize; and
wherein said fine fraction has been obtained by screening the intermediate fraction undersize from c1) to obtain said fine fraction.

According to another aspect of the present invention, there is provided a method for decontaminating soil containing inorganic contaminants having a degree of liberation of at least 60%, comprising the steps of a) screening the soil to remove a non-contaminated fraction of the soil, wherein said non-contaminated fraction consists essentially in particles larger than those of a coarse fraction; b) screening the undersize from step a) to obtain the coarse fraction, and a coarse fraction undersize; c) removing at least a portion of the inorganic contaminants from the coarse fraction, with a jig; d) screening the coarse fraction undersize from step b) to obtain an intermediate fraction, and a fine fraction; e) removing at least a portion of the inorganic contaminants from the intermediate fraction, with a separator selected from the group consisting of a spiral and a fluidised bed classifier; and f) removing at least a portion of the inorganic contaminants from the fine fraction, with a separator selected from the group consisting of a multi-gravity separator and a flotation cell. According to other specific embodiments, the coarse fraction may consist essentially in particles having a size within the range 1.7 mm and 6.4 mm, inclusively; the intermediate fraction may consist essentially in particles having a size within the range of 38 µm to 1.7 mm (e.g. within the range of 106 µm to 1.7 mm), inclusively;

and the fine fraction may consist, essentially in particles having a size equal to or smaller than 106 µm. In a particular embodiment, the method further comprises a step of removing from an organically contaminated portion of the soil at least a portion of the organic contaminants contained therein with an attrition cell. In a more specific embodiment, the removal of organic contaminants may be performed by a) identifying the at least one organically contaminated grain-size fraction; b) isolating the at least one contaminated fraction identified in step a); c) washing the at least one contaminated fraction isolated in step b) in an attrition cell, whereby at least a portion of organic contaminants contained therein are solubilised in a liquid phase; d) separating from a solid phase the liquid phase of step c) containing solubilised organic contaminants; e) flocculating at least a portion of the solubilised organic contaminants to produce a flocculated phase, whereby the solid phase of step d) is soil impoverished in organic contaminants.

According to a further aspect of the present invention, there is provided a method for decontaminating soil containing inorganic contaminants having a degree of liberation of at least 60%, comprising the steps of a) screening the soil to remove a non-contaminated fraction of the soil, wherein said non-contaminated fraction consists essentially in particles larger than those a coarse fraction; b) screening the undersize from step a) to obtain the coarse fraction, and a coarse fraction undersize; c) removing at least a portion of the inorganic contaminants from the coarse fraction, with a jig; d) screening the coarse fraction undersize from step b) to obtain an intermediate fraction, and an intermediate fraction undersize; e) removing at least a portion of the inorganic contaminants from the intermediate fraction, with a separator selected from the group consisting of a spiral and a fluidised bed classifier; f) screening the intermediate fraction undersize from step d) to obtain a fine fraction; and g) removing at least a portion of the inorganic contaminants from the fine fraction, with a separator selected from the group consisting of multi-gravity separator and a flotation cell. According to other specific embodiments, the coarse fraction may consist essentially in particles having a size within the range 1.7 mm and 6.4 mm, inclusively; the intermediate fraction may consist essentially in particles having a size within the range of 38 µm to 1.7 mm (e.g. within the range of 106 µm to 1.7 mm), inclusively; and the fine fraction may consist essentially in particles having a size equal to or smaller than 106 µm. In a particular embodiment, the method further comprises a step of removing from an organically contaminated portion of the soil at least a portion of the organic contaminants contained therein with an attrition cell. In a more specific embodiment, the removal of organic contaminants is may be performed by a) identifying the at least one organically contaminated grain-size fraction; b) isolating the at least one contaminated fraction identified in step a); c) washing the at least one contaminated fraction isolated in step b) in an attrition cell, whereby at least a portion of organic contaminants contained therein are solubilised in a liquid phase; d) separating from a solid phase the liquid phase of step c) containing solubilised organic contaminants; e) flocculating at least a portion of the solubilised organic contaminants to produce a flocculated phase, whereby the solid phase of step d) is soil impoverished in organic contaminants.

As used herein, the term "inorganic contaminants" includes both radioactive and non-radioactive metals, and is otherwise intended to encompass the full breadth of metal contaminants known to those skilled in the art; in particular for example as used herein, the terminology "inorganic contaminants" is meant to include or refer to Pb, Cu and Zn.

As used herein, the terminology "organic contaminants" is intended to refer to all organic compounds which tend to adhere to soil, and which may present environmental hazards when permitted to remain in the soil; in particular for example as used herein, the terminology "organic contaminants" is meant to include or refer to C10–C50 petroleum hydrocarbons (i.e. hydrocarbon materials containing from 10 to 50 carbon atoms).

As used herein the terminology "degree of liberation" is meant to refer to the percentage of minerals occurring as free particles in the soil in relation to the total content of minerals. The "degree of liberation" may be determined (e.g. visually counted) for example in accordance with the teachings of Wills, B. A., 1998, "Mineral processing technology", fourth edition, Pergamon Press, pg 855 (the entire contents of this document and in particular pages 25 to 29 from Willis is/are incorporated herein by reference).

As used herein, the terminology "particulate form" is meant to define the state of inorganic contaminants that are not adsorbed on soil particles or dissolved in the soil.

As used herein, the terminology or word "aggregate" and any similar word (whether as noun, adjective, etc.) shall be understood as referring to or as characterizing (or emphasising) a "soil", "sediment", "material", etc. or any portion thereof as a mass of individual particles or components of the same or varied size (e.g. the size of the components may be not uniform and may range from microscopic granules to 10 cm and larger); it is also to be understood that the particle size distribution of any particular soil mass, etc. may be different from that of another soil mass, etc.

As, used herein, the terminology or word "soil" and the like (whether as noun, adjective, etc.) shall be understood as referring to superficial earth crust, whether natural or man made (i.e. unconsolidated mantle), namely aggregate material including but not limited to aggregate material disposed on dry land masses (e.g. soil aggregate material);

sedimentary aggregate including any bottom sediments of fresh or marine water systems;

aggregate material which has an organic matter portion derived for example from plant or animal sources; organic material such as plant material would usually form part of the courser aggregate material as described hereinafter and would include, for example, tree stumps, ligneous particles, etc.;

aggregate material derived from human activities, such as, for example, mineral aggregate materials, fill aggregate materials as well as sediments arising in water-ways;

mineral aggregate residues from mining operations, such as those present in a tailings pond;

etc.

Thus as used herein, the terminology "soil" includes all forms of particulate matter, such as, for example, clay, fines, sand, rock, humus, etc. and in particular for example, soil particles and embankment material particles.

As used herein, the terminology "inorganic contaminants" refers to metals (e.g. Pb, Cu and Zn) individually or collectively. The terminology "at least a portion of inorganic contaminants" is meant to refer to at least a portion of any one metal (e.g. any one of Pb, Cu and Zn) or of a combination thereof.

As used herein, the terminology "impoverished" is used herein to refer to the reduced content of contaminants in a sample of soil after being subjected to the method of the present invention ("treated soil") as compared to its content prior to being so subjected. In particular, it may refer to the reduced content in any one metal or a combination thereof (e.g. of Zn, Pb and/or Cu).

As used herein, the terminology "consists essentially in" is meant to reflect the fact that the means according to specific embodiments used for isolating a specific soil fraction are by nature imprecise so that the fraction may contain particles larger than the specified threshold.

As used herein, the terminology "large debris" is meant to refer to material in the soil to be decontaminated that has a size equal or larger than 6 cm. It includes material such as rocks and large pieces of metals.

As used herein, the terminology "coarse fraction" is meant to refer to the fraction of the soil from which large debris have been removed and constituted of particles of a size within the functional range of the separator used to decontaminate the coarse fraction, namely a jig. Jigs are recognised as being functional with particles larger than 170 µm.

As used herein, the terminology "intermediate fraction" is meant to refer to a fraction of the soil and having a particulate size that is smaller than that of the coarse fraction and that is within the functional range of the separator used to decontaminate the intermediate fraction, namely a separator selected from the group consisting of spiral and fluidised bed classifier. Hence, the spiral and the fluidised bed classifier are recognised as being functional with particles within the size range 60 µm and 2000 µm.

As used herein, the terminology "fine fraction" is meant to refer to a fraction of the soil having a particulate size that is smaller than that of the intermediate fraction and that is within the functional range of the separator used to decontaminate the fine fraction, namely a separator selected from the group consisting of a multi-gravity separator ("MGS") and a flotation cell. Hence, the MGS and the flotation cells are recognised as being functional with particles within the size range 1 µm to 300 µm, and 10 µm to 300 µm, respectively.

As used herein, the terminology "classify", "classification" and the like shall, be understood as referring to the dividing of an aggregate material into size groupings or portions and as including separation of constituent components in accordance with size, (e.g. size separation by screening, gravity separation, etc.).

It is to be understood herein, that if a "class", "range", "group of substances", etc. is mentioned with respect to a particular characteristic (e.g., temperature, concentration, size, time etc.) of the present invention, the present invention relates to and explicitly incorporates herein each and every specific member and combination of sub-class, sub-ranges or sub-groups therein whatsoever. Thus, any specified class, range or group is to be understood as a shorthand way of referring to each and every member of a class, range or group individually as well as each and every possible sub-class, sub-range or sub-group encompassed therein; and similarly with respect to any sub-class, sub-range or sub-group therein. Thus, for example, with respect to the number of carbon atoms, the mention of the range of 1 to 6 carbon atoms is to be understood herein as incorporating each and every individual number of carbon atoms as well as sub-ranges such as, for example, 1 carbon atoms, 3 carbon atoms, 4 to 6 carbon atoms, etc.;

with respect time, a time of 1 minute or more is to be understood as specifically incorporating herein each and every individual time, as well as sub-range, above 1 minute, such as for example 1 minute, 3 to 15 minutes, 1 minute to 20 hours, 1 to 3 hours, 16 hours, 3 hours to 20 hours etc.; and similarly with respect to any other parameters whatsoever, such as percentage(s), particle size, particle size disribution, volume, pore size, temperature, pressure, concentrations, elements, (carbon) atoms, etc.

It is in particular to be understood herein that for any class, group or range, no matter how defined, a reference thereto is a shorthand way of mentioning and including herein each and every individual member described thereby as well as each and every possible class or sub-group or sub-class of members whether such class or sub-class is defined as positively including particular members, as excluding particular members or a combination thereof; for example an exclusionary definition for a formula may read as follows: "provided that when one of A and B is —X and the other is Y, —X may not be Z".

DESCRIPTION OF SPECIFIC EMBODIMENTS

Figure 2:
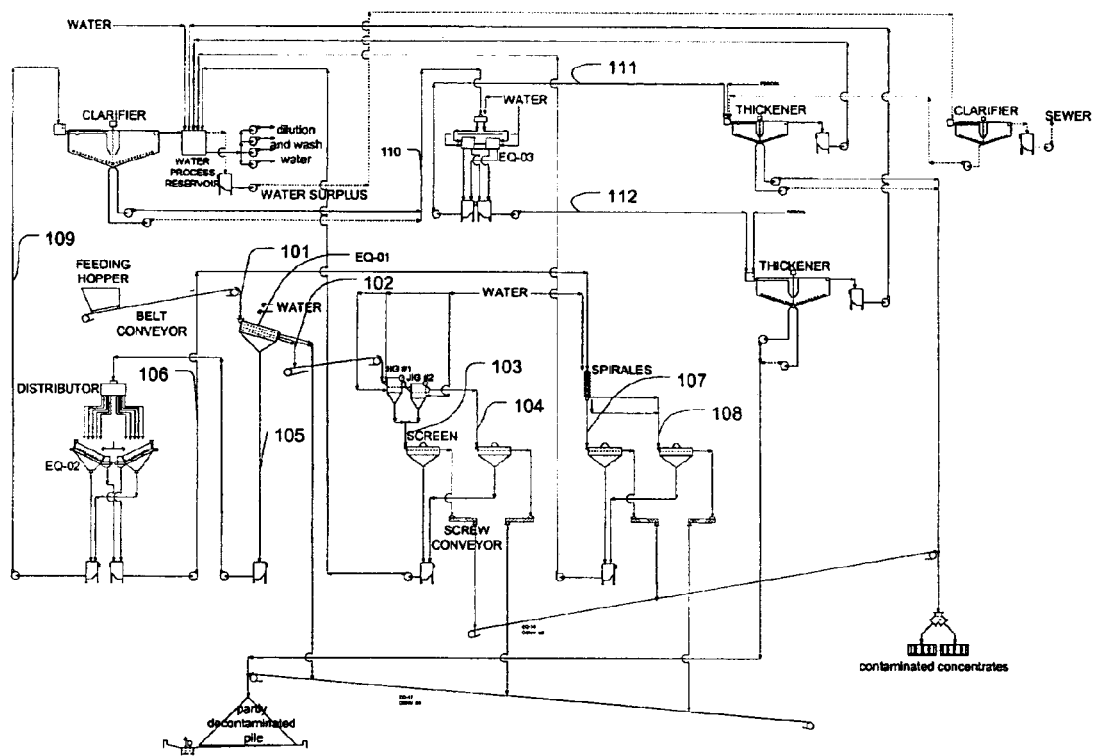
FIG. 2 illustrates a flow diagram of the inorganic contaminants treatment according to specific embodiments of the method of the present invention.
Figure 3:
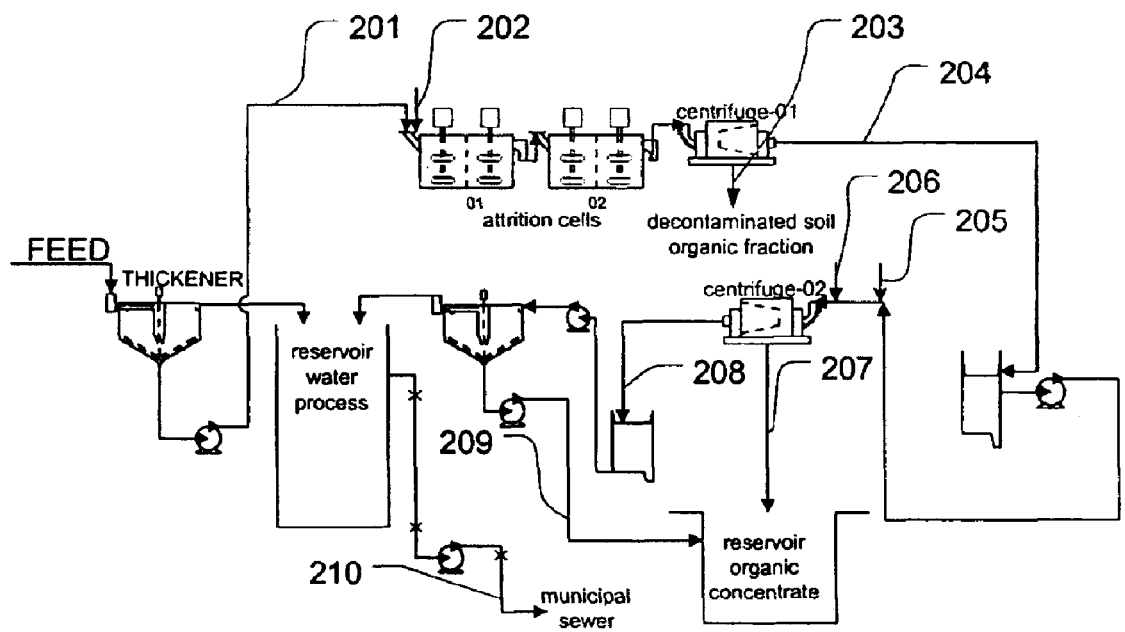
FIG. 3 illustrates a flow diagram of the organic contaminants treatment according to specific embodiments of the method of the present invention.

FIGS. 2 and 3 illustrate various steps included in a specific embodiment of the present invention. The present invention describes a method for the removal of contaminants from soil. A specific embodiment of the method comprises two general steps. The first step consists in the removal of inorganic contaminants from the soil. In the second step, organic contaminants are removed from soil impoverished in inorganic contaminants. If required, for recycling purpose, organic contaminants can also be isolated from the inorganic concentrates. In a further specific embodiment, the method includes complete dehydration of the decontaminated material, yielding final products ready for disposal. This is advantageous for the following reasons:

a) versatility: the method can thus be used in cases where the soil carries only either one of inorganic or organic contaminants;

b) reduction of volume treated: only the most contaminated grain-size fraction(s) of the material is subjected to organic contaminants removal;

c) to facilitate the treatment, the operator can choose to use the dehydrated form of the contaminated material. This can be of interest when surfactant agents are added to the solid for removal of organic contaminants.

The inorganic and organic concentrates obtained from the process can be used as feedstock to other industries.

Inorganic Contaminants Removal

Referring to FIG. 2, the contaminated soil 101, is first pre-treated on a triple decks vibrating screen, EQ-01, where the non-contaminated fraction and large debris are separated out and routed on a belt conveyor to the impoverished soil pile. Water is also added in order to produce a pulp for the subsequent operations and to facilitate the screening of the material. In a specific embodiment where the soil used had the contaminants distribution illustrated at FIG. 1, the apertures of the three screens were set to 18 mm, 6.4 mm and 1.7 mm respectively. In this non-limiting example, the fraction +6.4 mm was directed to the decontaminated material pile because globally, the resulting material (+6.4 mm and decontaminated material) satisfied the province of Quebec C norms for Pb, Zn and Cu. The apertures of the screens is therefore adjusted to the required grain-size depending of the grain-size distribution of the contaminants in the targeted material and the environmental norms of the contaminated soil's jurisdiction.

The contaminated fraction −6.4 mm+1.7 mm, namely here the coarse fraction, 102, obtained from the previous screening procedures was transported by a belt conveyor to the jigs section. Water was added to the pulp to obtain a pulp % weight ratio solid/pulp of 11%. The contaminated pulp was fed to two jigs set in line. The action of the first jig produced a concentrate of heavy minerals and materials containing mainly the inorganic contaminants and a lighter material impoverished in contaminants. The lighter material was fed to a second jig for a supplementary gravimetric separation. This second separation was conducted to reach Quebec inorganic contaminants regulation limits for soil decontamination and may therefore not be desirable for decontaminating soils in other jurisdictions. The jigs' highly contaminated concentrates, 103, were combined and dehydrated using a vibrating screen of 106 μm aperture. Likewise, the partly decontaminated soil, 104, was dehydrated by a similar procedure. These screens were employed solely for dehydration purpose. The resulting water was free of solid and therefore returned to the water process reservoir. Screw conveyors transported the concentrates to a container and the partly decontaminated material to the stocking pile.

The undersize, 105, −1.7 mm was fed to two vibrating screens with cut off apertures of 106 μm, EQ-02. The resulting grain-size fraction −1.7 mm+106 μm, namely the intermediate fraction, 106, was diluted with wash water to a weight ratio of 30% and then directed to spirals (Reichert MG-4). The products obtained from the spirals, a dense fraction rich in inorganic contaminants, 107, and light fraction partly decontaminated, 108, were sent to dehydration vibrating screens, aperture 106 μm. The water was pumped to the water process reservoir. Screw conveyors directed the contaminated concentrate to containers and the partly decontaminated phase to the stocking pile.

The undersize, 109, −106 μm, namely the fine fraction was pumped to a clarifier. The overflow was returned to the water process reservoir. The underflow, 110, adjusted to a weight ratio of 30%, with dilution water, was directed to a MegaSep MGS Mozley™ unit, EQ-03. The centrifugal force combined to the vibrating action of this equipment permitted a gravimetric separation of the fines based on volumetric mass differences. Two flows were obtained from the MegaSep, a dense one and a light one. The dense fraction rich in inorganic contaminants, 111, was pumped to a thickener. The underflow was returned to the water process reservoir while the underflow was pumped to the containers receiving the highly contaminated concentrates. The light fraction, 112, was submitted to a similar set of operations with the underflow water returning to the water process reservoir and the underflow to the partly decontaminated pile.

The water surplus exiting the water process reservoir was clarified before being rejected in the municipal water collecting system.

Figure 4:
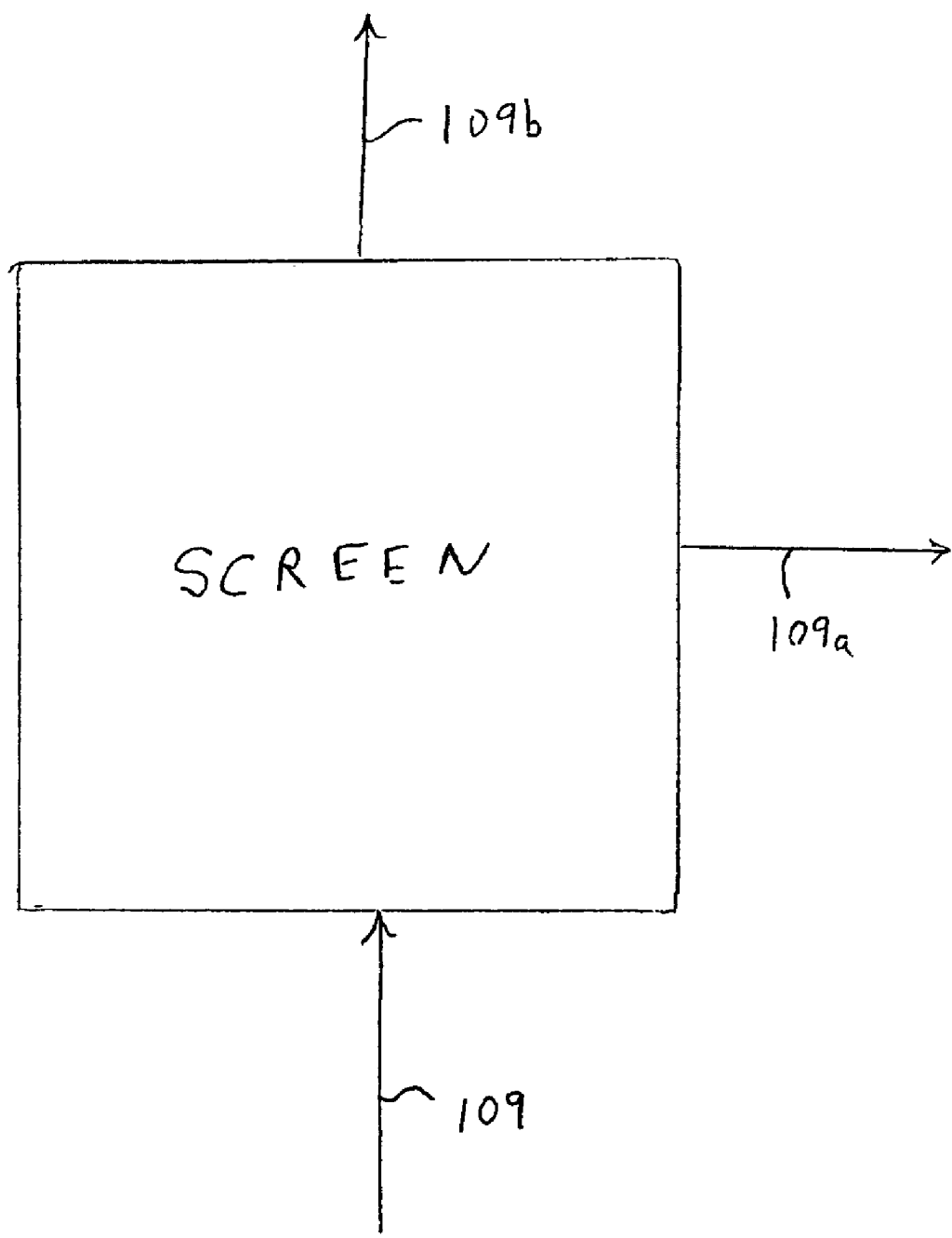
FIG. 4 illustrates in partial block diagram format an example modification to the flow diagram of FIG. 2.

FIG. 4 illustrates an alternative flow diagram based on FIG. 2 but wherein the undersize 109 is directed to a further screening so as to obtain an oversize 109a and a fine fraction 109b, the fine fraction 109b being sent on to the separator EQ-03 (i.e. the MegaSep MGS Mozley™unit).

Organic Contaminants Removal

Although the specific embodiment described hereafter is applicable to material where only the −106 μm fraction is contaminated by organic products, the organic process disclosed generally herein is applicable to any grain-size fraction. Also, in this particular embodiment, the material used was not contaminated by inorganic contaminants so that the material was subjected to the organic decontamination step only. However, had it been contaminated also by inorganics, the inorganic removal step would have first been performed, and then, the fraction(s) of the partially decontaminated material containing the contaminants would have been subjected to the organics removal step.

In some cases, other equipment adapted to the grain-size fraction of the material can replace the centrifuges for the dehydration steps. Referring to FIG. 3, after the screening procedures, the −106 μm flow was directed to a thickener to increase its weight ratio to 45%. The thickener underflow, 201, was pumped to two in line attrition cells. Before the attrition step, the surfactant agent Hostapur™ SAS 60 was added to the pulp, 202. This surfactant solubilizes hydrophobic organic contaminants during attrition. The solid was then separated from the pulp by centrifugation, centrifuge-01. The solid, 70% weight ratio, centrifuge underflow, substantially free from the organic contaminants, 203, was accumulated in a reservoir. The centrifuge overflow, 204, mainly water containing the dissolved organic contaminants, was pumped to a reservoir. The reservoir exit flow was routed to a water treatment process in order to flocculate/coagulate the organic contaminants. The exit flow was pumped to a second centrifuge, centrifuge-02. At the entry of the centrifuge, a coagulating agent, 205, (Alum™, Al2 (SO4)3) and a flocculating agent, 206, (Percol™, 338) were added to the flow. The organic concentrate 207, obtained from the centrifuge underflow was disposed in a reservoir. The centrifuge overflow, 208 was directed to a clarifier where fines sunk at the bottom. The clarifier underflow, 209, was combined with the organic contaminants concentrate. The clarifier underflow was pumped to the water process reservoir. Water surplus, 210, could be returned if necessary to the municipal sewer.

For all samples studied, the water rejected from the processes illustrated at FIGS. 2 and 3 showed no sign of contamination either by organic or inorganic contaminants.

Any means for routing and transferring the soil, material or pulp is within the scope of these inventions.

The following inventions are described in further details by the following non-limiting examples.

The implementation and results of Examples 2 to 6 provided herein are summarised in Tables 1 and 37 to 43.

Optimisation results are presented in Tables 3 to 36 below.

TABLE 1

Removal of inorganic and organic contaminants according to the methods described.

| Examples No | Source of sample | Inorganics treatment equipments used | organics treatment equipments used | Contaminants | | | |
|---|---|---|---|---|---|---|---|
| | | | | Inorganics | | Organics | |
| | | | | initial (ppm)[3] | removal (%) | initial (ppm)[4] | removal (%) |
| 1 | Montreal Soil[1] | +6.4 mm, screens | | 2544 | NA | ND | NA |
| | | −6.4 + 1.7 mm, jigs, 2 in line | | 2768 | 75 | ND | NA |
| | | −1.7 mm + 106 μm, spirals | | 3196 | 65 | ND | NA |
| | | −106 μm, MGS Mozley | | 5190 | 70 | ND | NA |

TABLE 1-continued

Removal of inorganic and organic contaminants according to the methods described.

| | | | | Contaminants | | | |
|---|---|---|---|---|---|---|---|
| | | | | Inorganics | | Organics | |
| Examples No | Source of sample | Inorganics treatment equipments used | organics treatment equipments used | initial (ppm)[-3] | removal (%) | initial (ppm)[-4] | removal (%) |
| 2 | Montreal Soil[-1] | +106 µm same us example 1<br>−106 µm, froth flotation cell | | 8508<br>5190 | 70<br>55 | ND<br>ND | NA<br>NA |
| 3 | Montreal Soil[-1] | +6.4 mm, screens<br>−6.4 + 1.7 mm, jigs, 2 in line<br>−1.7 mm + 106 µm,<br>fluidized bed classifier<br>−106 µm, MGS Mozley | | 2544<br>2768<br>3196<br>5190 | NA<br>75<br>45<br>70 | ND<br>ND<br>ND<br>ND | NA<br>NA<br>NA<br>NA |
| 4 | Montreal Harbour[-2] | | −45 µm only, attrition cells, 2, in line<br>surfactant addition: Hustapur ™ SAS 60,<br>surfactant concentration, 5000 ppm<br>floculation agent: Percol ™ 338<br>coagulation agent: Alum ™<br>dewatering by centrifugation | NA<br>NA<br>NA<br>NA<br>NA<br>NA | | 29935 | 90 |
| 5 | Montreal Harbour[-2] | | −45 µm only, attrition cells, 2, in line<br>surfactant addition: Aerosol OT ™,<br>surfactant concentration, 10000 ppm<br>floculation agent: Percol ™ 338<br>coagulation agent: Alum ™<br>dewatering by centrifugation | NA<br>NA<br>NA<br>NA<br>NA<br>NA | | 28921 | 90 |

[-1]mass distribution: +6.4 mm: 38%; −6.4 + 1.7 mm: 15%; 1.7 mm + 106 µm: 20% −106 µm: 27%;
[-2]mass distribution −45 µm: 65%;
[-3]the initial inorganic contaminants values represent a summation of individual ppm concentrations for: Cu, Pb, Zn;
[-4]the initial value for organic contaminants refers to concentrations of $C_{10}$–$C_{50}$;
NA: not applicable;
ND: not detected or below targeted decontamination values.

The chemical analyses for the inorganic contaminants were performed by inductively coupled plasma atomic emission spectroscopy ("ICP-AES"). The organic contaminants were determined by an extraction in hexane with a finish by either a gravimetric method or gas chromatography. The samples were also submitted to a complete mineralogical and grain-size analysis.

EXAMPLE 1

Optimization Assays and Results

Assays were performed to determine the inorganic contaminants removal efficiency of various separators on samples of contaminated soil of the Montreal region. Each separator was tested with various granulometric fractions of soil. The efficiency of the present method was analysed in terms of environmental norms applicable in Montreal, namely the MENVIQ norms (Table 2). Tables 3 to 10 below provide the optimisation parameters and results for the jig. Tables 13 to 22 below provide the optimisation parameters of the spiral. Tables 23 to 24 below provide the optimisation parameters of the fluidised bed classifier. Tables 25 to 34 below provide the optimisation parameters of the multi-gravity separator. Tables 35 to 36 below provide the optimisation parameters of the flotation cells. The results presented in these tables that all the separators used were able to generate soil impoverished in inorganic contaminants. The operation parameters presented in these tables are those that varied during the assays. The feed contents were calculated along with light and heavy fraction contents of inorganic contaminants. Most cleaning coefficients were calculated with the following formula (1-(output concentration/feed concentration)*100 because the output is normally constituted of the light fraction and the concentrate of the heavy fraction. The MGS cleaning coefficients were calculated with the following formula: (1-(output heavy fraction concentration/feed concentration)*100 because in the optimisation trials, the contaminants were concentrated in the light fraction for an unknown reason. In the pilot/long-term trials, no such aberration occurred: the contaminants were concentrated in the heavy fraction.

EXAMPLE 2

Inorganics Removal in Soil Divided in Four Fractions Comprising the use of Spirals Assays were performed to determine the consistency in inorganic contaminants removal efficiency of a method of decontamination according to a specific embodiment of the method of the present invention, namely one using jigs, spirals and MGS. Samples of the most contaminated zone of a contaminated land of the region of Montreal. More than 50% of the mass was localised in the grain-size fraction superior to 106 µm. The +106 µm fraction contained about 75% of the inorganic contaminants. This soil is typical of the Montreal contaminated areas. This method permitted the removal of 70% of the inorganic contaminants. For this Example, samples were taken from the most contaminated zone of a Montreal contaminated soil, Table 37 below provides operation parameters and cleaning coefficients for each of Pb, Cu and Zn separately. Because the organic contaminants concentrations were below the targeted decontamination values, they were not treated.

EXAMPLE 3

Inorganics Removal in Soil Divided in 2 Fractions

For the fraction −106 µm, a froth flotation cell replaced the MGS Mozley gravimetric separator. Results indicated a slight decrease in the removal of the inorganic contaminants, for this specific grain-size fraction, from 70% to 55%. This reduction in the removal of contaminants was not detrimental to the overall targeted decontamination values.

EXAMPLE 4

Inorganics Removal in Soil Divided in 4 Fractions Comprising the use of Fluidised Bed Classifier In this example, the spirals were replaced by a fluidised bed classifier for the decontamination of the grain-size fraction −1.7 mm+106 μm. Removal of the inorganic contaminants dropped from 65% to 45%.

EXAMPLE 5

Organics Removal in −45 μm Fraction of Harbour Comprising Hostapur SAS60™

The starting material consisted in a highly contaminated sediment obtained form the Montreal Harbour. Sixty per cent of this material showed a grain-size distribution below 45 μm and contained 30 000 ppm of C10–C50 petroleum hydrocarbons. The surfactant used Hostapur™SAS 60, at the concentration of 5 000 ppm, is manufactured by Hoechst Inc. After the attrition steps, the C10–C50 concentration in the sediment dropped by 90%.

EXAMPLE 6

Organics Removal in −45 μm Fraction of Harbour Comprising Aerosol OT™

The surfactant used was Aerosol OT™ also at the 5 000 ppm level. Decontamination results achieved were similar to those reached with Hostapur™.

TABLE 2

Inorganic contaminant norms applicable in the province of Quebec, Canada

|  | Cu Ppm | Pb Ppm | Zn Ppm |
|---|---|---|---|
| Criteria B, MENVIQ | 100 | 500 | 500 |
| Criteria C, MENVIQ | 500 | 1000 | 1500 |

TABLE 3

Operation parameters, and ppm contents of the −50 +1.7 mm (crushed to −6.4 mm) fraction of the soil

| | Parameters | | | | | Calculated feed | | | Light fraction | | | | Heavy fraction | | | |
|---|---|---|---|---|---|---|---|---|---|---|---|---|---|---|---|---|
| Trial | Solid kg/min | water l/min | % solid % | frequency cp/min | amplitude mm | Cu ppm | Pb ppm | Zn ppm | Weight kg | Cu ppm | Pb ppm | Zn ppm | Weight kg | Cu ppm | Pb ppm | Zn ppm |
| 1 | 2 | 23 | 8 | 275 | 16 | 160 | 364 | 290 | 52 | 140 | 160 | 280 | 2.57 | 570 | 4500 | 490 |
| 2 | 2 | 20 | 9 | 275 | 16 | 204 | 431 | 535 | 45.2 | 150 | 290 | 460 | 2.71 | 1100 | 2800 | 1800 |
| 3 | 2 | 13 | 13 | 275 | 16 | 171 | 447 | 267 | 58.5 | 100 | 240 | 260 | 3.98 | 1200 | 3500 | 380 |
| 4 | 2 | 13 | 13 | 350 | 16 | 225 | 479 | 537 | 35.5 | 220 | 200 | 520 | 3.65 | 280 | 3200 | 710 |

TABLE 4

Cleaning coefficients of the jig on the soil fraction defined in Table 3

| | Light Fraction | | | | Heavy Fraction | | | | Cleaning | | |
|---|---|---|---|---|---|---|---|---|---|---|---|
| Trial | Weight % | Cu % | Pb % | Zn % | Weight % | Cu % | Pb % | Zn % | Cu % | Pb % | Zn % |
| 1 | 95.29 | 83.3 | 41.8 | 92.04 | 4.71 | 16.8 | 58.2 | 7.96 | 13 | 56 | 3 |
| 2 | 94.34 | 69.5 | 63.3 | 81 | 5.66 | 30.5 | 36.6 | 19 | 26 | 33 | 14 |
| 3 | 93.63 | 55.1 | 50.2 | 90.96 | 6.37 | 45 | 49.8 | 9.04 | 42 | 46 | 3 |
| 4 | 90.68 | 88.4 | 37.8 | 87.69 | 9.32 | 11.6 | 62.2 | 12.31 | 2 | 58 | 3 |

TABLE 5

Operation parameters, and ppm contents of the −12.7 +6.4 mm fraction of the soil

| | Parameters | | | | | Calculated feed | | | Light fraction | | | | Heavy fraction | | | |
|---|---|---|---|---|---|---|---|---|---|---|---|---|---|---|---|---|
| Trial | Solid kg/min | water l/min | % solid % | frequency cp/min | amplitude mm | Cu ppm | Pb ppm | Zn ppm | Weight kg | Cu ppm | Pb ppm | Zn ppm | Weight kg | Cu ppm | Pb ppm | Zn ppm |
| 5(1)[d] | 2 | 40 | 5 | 275 | 16 | 217 | 175 | 840 | 17.1 | 210 | 110 | 570 | 1.34 | 200 | 680 | 1900 |
| 5(2)[d] | 2 | 40 | 5 | 275 | 16 | 217 | 175 | 840 | 17.1 | 210 | 110 | 570 | 1.36 | 320 | 500 | 3200 |

[d]two concentrates were taken during the same trial, namely 5(1) and 5(2)

TABLE 6

Cleaning coefficients of the jig on the soil fraction defined in Table 5

| | Light fraction | | | | Heavy fraction | | | | Cleaning | | |
|---|---|---|---|---|---|---|---|---|---|---|---|
| Trial | Weight % | Cu % | Pb % | Zn % | Weight % | Cu % | Pb % | Zn % | Cu % | Pb % | Zn % |
| 5(1)[c] | 86.3 | 83.6 | 49.7 | 58.6 | 6.76 | 6.24 | 35.4 | 15.3 | 3 | 37 | 32 |
| 5(2)[c] | 86.3 | 83.6 | 49.7 | 58.6 | 6.86 | 10.1 | 19.6 | 26.1 | 3 | 37 | 32 |

[c] two concentrates were taken during the same trial, namely 5(1) and 5(2)

TABLE 7

Operation parameters, and ppm contents of the −12.7 +1.7 mm fraction of the soil

| | Parameters | | | | | Calculated feed | | | Light fraction | | | | Heavy fraction | | | |
|---|---|---|---|---|---|---|---|---|---|---|---|---|---|---|---|---|
| Trial | Solid kg/min | water l/min | % solid % | frequency cp/min | amplitude mm | Cu ppm | Pb ppm | Zn ppm | Weight kg | Cu ppm | Pb ppm | Zn ppm | Weight kg | Cu ppm | Pb ppm | Zn ppm |
| 6 | 2 | 23 | 8 | 275 | 16 | 1547 | 1800 | 1825 | 16.8 | 1500 | 1800 | 1800 | 0.745 | 2600 | 1800 | 2400 |
| 7 | 2 | 18 | 10 | 275 | 16 | 1174 | 359 | 2013 | 18.9 | 400 | 200 | 1900 | 0.745 | 20830 | 4400 | 4900 |
| 8 | 2 | 10 | 16.67 | 275 | 16 | 2798 | 448 | 1229 | 17.7 | 2700 | 250 | 1100 | 0.828 | 4900 | 4700 | 4000 |
| 9 | 2 | 10 | 16.67 | 330 | 16 | 675 | 320 | 842 | 17.7 | 440 | 190 | 750 | 1.293 | 3900 | 2100 | 2100 |

TABLE 8

Cleaning coefficients of the jig on the soil fraction defined in Table 7

| | Light fraction | | | | Heavy fraction | | | | Cleaning | | |
|---|---|---|---|---|---|---|---|---|---|---|---|
| Trial | Weight % | Cu % | Pb % | Zn % | Weight % | Cu % | Pb % | Zn % | Cu % | Pb % | Zn % |
| 6 | 95.76 | 92.9 | 95.8 | 94.42 | 4.24 | 7.13 | 4.24 | 5.58 | 3 | 0 | 1 |
| 7 | 96.21 | 32.8 | 53.6 | 90.78 | 3.79 | 67.2 | 46.4 | 9.22 | 66 | 44 | 6 |
| 8 | 95.54 | 92.2 | 53.2 | 85.47 | 4.46 | 7.82 | 46.8 | 14.53 | 4 | 44 | 10 |
| 9 | 93.18 | 60.7 | 55.3 | 83 | 6.82 | 39.3 | 44.7 | 17 | 35 | 41 | 11 |

TABLE 9

Operation parameters, and ppm contents of the −6.4 +1.7 mm fraction of the soil

| | Parameters | | | | | Calculated feed | | | Light fraction | | | | Heavy fraction | | | |
|---|---|---|---|---|---|---|---|---|---|---|---|---|---|---|---|---|
| Trial | Solid kg/min | water l/min | % solid % | frequency cp/min | amplitude mm | Cu ppm | Pb ppm | Zn ppm | Weight kg | Cu ppm | Pb ppm | Zn ppm | Weight kg | Cu ppm | Pb ppm | Zn ppm |
| 10 | 2 | 23 | 8 | 275 | 16 | 668 | 545 | 1573 | 19.23 | 440 | 410 | 1500 | 0.398 | 11700 | 7100 | 5100 |
| 11 | 2 | 18 | 10 | 275 | 16 | 492 | 574 | 3243 | 16.51 | 260 | 430 | 3200 | 0.227 | 17400 | 11100 | 6400 |
| 12 | 2 | 10 | 16.67 | 275 | 16 | 355 | 984 | 1636 | 16.65 | 260 | 840 | 1600 | 0.222 | 7500 | 11800 | 4400 |
| 13 | 2 | 10 | 16.67 | 330 | 16 | 2855 | 1009 | 2265 | 16 | 2500 | 510 | 2100 | 0.329 | 20100 | 25300 | 10300 |

TABLE 10

Cleaning coefficients of the jig on the soil fraction defined in Table 9

| | Light fraction | | | | Heavy fraction | | | | Cleaning | | |
|---|---|---|---|---|---|---|---|---|---|---|---|
| Trial | Weight % | Cu % | Pb % | Zn % | Weight % | Cu % | Pb % | Zn % | Cu % | Pb % | Zn % |
| 10 | 97.97 | 64.5 | 73.6 | 93.4 | 2.3 | 35.5 | 26.4 | 6.57 | 34 | 25 | 5 |
| 11 | 98.64 | 52.1 | 73.8 | 97.3 | 1.36 | 47.9 | 26.2 | 2.68 | 47 | 25 | 1 |
| 12 | 98.68 | 72.2 | 84.2 | 96.5 | 1.32 | 27.8 | 15.8 | 3.54 | 27 | 15 | 2 |
| 13 | 97.99 | 85.8 | 49.5 | 90.8 | 2.01 | 14.2 | 50.5 | 9.16 | 12 | 49 | 7 |

TABLE 11

Operation parameters and ppm contents of the −6.4 +1.7 mm fraction of the soil, sequentially

| | Parameters[-1] | | | | | Calculated feed | | | Light fraction | | | | | Heavy fraction | | | | |
|---|---|---|---|---|---|---|---|---|---|---|---|---|---|---|---|---|---|---|
| Trial | Solid kg/min | water l/min | % solid % | frequency cp/min | amplitude mm | Cu ppm | Pb ppm | Zn ppm | Weight kg | Cu ppm | Pb ppm | Zn ppm | | Weight kg | Cu ppm | Pb ppm | Zn ppm | |
| 14[d] | 2 | 17 | 10.5 | 330 | 16 | 1121 | 793 | 2880 | 14.67 | 470 | 230 | 2600 | | 0.936 | 11335 | 9620 | 7277 | |
| 15[d] | 2 | 17 | 10.5 | 330 | 16 | 286.9 | 284 | 1032 | 12.84 | 220 | 250 | 980 | | 0.223 | 4138 | 2264 | 4038 | |

[d]the output of trial 14 was used as feed for the trial 15

TABLE 12

Cleaning coefficients of the jig on the soil fraction defined in Table 11

| | Light fraction | | | | Heavy fraction | | | | Cleaning | | |
|---|---|---|---|---|---|---|---|---|---|---|---|
| Trial | Weight % | Cu % | Pb % | Zn % | Weight % | Cu % | Pb % | Zn % | Cu % | Pb % | Zn % |
| 14[d] | 94 | 39.4 | 27.3 | 84.9 | 6 | 60.6 | 72.7 | 15.2 | 58 | 71 | 10 |
| 15[d] | 98.64 | 75.4 | 86.4 | 93.3 | 1.71 | 24.7 | 13.6 | 6.7 | 23 | 12 | 5 |
| com[4] | 92.4 | | | | 7.71 | | | | 80 | 68 | 15 |

[4]the combination of the concentrates of 14 and 15

TABLE 13

Operation parameters and ppm contents of the −1.7 mm +0.3 mm fraction of the soil

| | Parameters | | | | Calculated feed | | | Light fraction | | | |
|---|---|---|---|---|---|---|---|---|---|---|---|
| Trial | Solid kg/min | Pulp water l/min | % solid % | washing water (l/min) | Cu ppm | Pb ppm | Zn ppm | Weight kg | Cu ppm | Pb ppm | Zn ppm |
| 1 | 25 | 37 | 40.32 | 0 | 1718 | 755 | 1907 | 1.46 | 820 | 410 | 1800 |
| 2 | 25 | 37 | 40.32 | 0 | 1162 | 746 | 1747 | 1.5 | 720 | 490 | 1700 |
| 3 | 25 | 37 | 40.32 | 0 | 1523 | 748 | 1931 | 1.48 | 720 | 430 | 1900 |
| 4 | 25 | 58 | 30.12 | 0 | 1496 | 713 | 1776 | 1.54 | 880 | 450 | 1800 |
| 5 | 25 | 58 | 30.12 | 0 | 1596 | 783 | 1508 | 1.41 | 870 | 430 | 1400 |
| 6 | 25 | 58 | 30.12 | 0 | 1510 | 904 | 1440 | 1.57 | 850 | 560 | 1400 |
| 7 | 25 | 75 | 25 | 0 | 1918 | 1030 | 1908 | 2.03 | 1300 | 520 | 1800 |
| 8 | 25 | 75 | 25 | 0 | 1522 | 964 | 1818 | 1.51 | 490 | 390 | 1600 |
| 9 | 25 | 75 | 25 | 0 | 1608 | 1224 | 1589 | 0.72 | 660 | 540 | 1400 |

TABLE 13-continued

Operation parameters and ppm contents of the −1.7 mm +0.3 mm fraction of the soil

| | Middling | | | | Heavy fraction | | | |
|---|---|---|---|---|---|---|---|---|
| Trial | Weight kg | Cu ppm | Pb ppm | Zn ppm | Weight kg | Cu ppm | Pb ppm | Zn ppm |
| 1 | 1.012 | 2500 | 870 | 2000 | 0.128 | 5800 | 3800 | 2400 |
| 2 | 0.858 | 1400 | 510 | 1700 | 0.250 | 300 | 3100 | 2200 |
| 3 | 0.712 | 1500 | 690 | 1800 | 0.379 | 4700 | 2100 | 2300 |
| 4 | 0.905 | 2200 | 740 | 1700 | 0.101 | 4600 | 4500 | 2100 |
| 5 | 0.829 | 2100 | 580 | 1600 | 0.195 | 4700 | 4200 | 1900 |
| 6 | 0.699 | 1400 | 930 | 1300 | 0.349 | 4700 | 2400 | 1900 |
| 7 | 0.373 | 2000 | 1300 | 1900 | 0.205 | 7900 | 5600 | 3000 |
| 8 | 0.935 | 1200 | 570 | 1900 | 0.198 | 10900 | 7200 | 3100 |
| 9 | 1.658 | 1300 | 1000 | 1500 | 0.217 | 7100 | 5200 | 2900 |

TABLE 14

Cleaning coefficients of the spiral on the soil fraction defined in Table 13

| | Parameters | | | | Light fraction | | | | Middling | | | | Heavy fraction | | | | Output Cleaning | | |
|---|---|---|---|---|---|---|---|---|---|---|---|---|---|---|---|---|---|---|---|
| | Pulp | | | washing | | | | | | | | | | | | | | | |
| Trial | Solid kg/min | water l/min | % solid % | water (l/min) | Weight % | Cu % | Pb % | Zn % | Weight % | Cu % | Pb % | Zn % | Weight % | Cu % | Pb % | Zn % | Cu % | Pb % | Zn % |
| 1 | 25 | 37 | 40.32 | 0 | 56.2 | 26.83 | 30.5 | 53.04 | 38.88 | 56.57 | 44.77 | 40.77 | 4.92 | 16.6 | 24.73 | 6.19 | 52 | 46 | 6 |
| 2 | 25 | 37 | 40.32 | 0 | 57.48 | 35.6 | 37.71 | 55.91 | 32.92 | 39.65 | 22.48 | 32.02 | 9.59 | 24.75 | 39.84 | 12.07 | 38 | 34 | 3 |
| 3 | 25 | 37 | 40.32 | 0 | 57.53 | 27.19 | 33.05 | 56.6 | 27.72 | 27.29 | 25.55 | 25.83 | 14.75 | 45.42 | 41.39 | 17.57 | 53 | 43 | 2 |
| 4 | 25 | 58 | 30.12 | 0 | 60.5 | 35.58 | 38.15 | 61.31 | 35.53 | 52.23 | 36.84 | 34 | 3.97 | 12.19 | 25 | 4.69 | 41 | 37 | −1 |
| 5 | 25 | 58 | 30.12 | 0 | 57.86 | 31.52 | 31.75 | 53.7 | 34.12 | 44.86 | 25.25 | 36.19 | 8.02 | 23.62 | 43.01 | 10.11 | 45 | 45 | 7 |
| 6 | 25 | 58 | 30.12 | 0 | 59.92 | 33.71 | 37.1 | 58.26 | 26.73 | 24.77 | 27.48 | 24.13 | 13.35 | 41.52 | 35.41 | 17.61 | 44 | 38 | 3 |
| 7 | 25 | 75 | 25 | 0 | 77.85 | 52.74 | 39.28 | 73.42 | 14.3 | 14.9 | 18.03 | 14.23 | 7.86 | 32.35 | 42.69 | 12.35 | 32 | 50 | 6 |
| 8 | 25 | 75 | 25 | 0 | 57.07 | 18.37 | 23.07 | 50.2 | 35.43 | 27.92 | 20.93 | 37.01 | 7.50 | 53.71 | 56 | 12.79 | 68 | 60 | 12 |
| 9 | 25 | 75 | 25 | 0 | 27.66 | 11.35 | 12.2 | 24.36 | 63.97 | 51.7 | 52.24 | 60.36 | 8.37 | 36.95 | 35.56 | 15.27 | 59 | 56 | 12 |

TABLE 15

Operation parameters and ppm contents of the −300 +106 $\mu$m fraction of the soil

| | Parameters | | | | Calculated feed | | | Light fraction | | | | Middling | | | | Heavy fraction | | | |
|---|---|---|---|---|---|---|---|---|---|---|---|---|---|---|---|---|---|---|---|
| | Solid | Pulp water | % solid | washing water | | | | | | | | | | | | | | | | |
| Trial | kg/min | l/min | % | (l/min) | Cu ppm | Pb ppm | Zn ppm | Weight kg | Cu ppm | Pb ppm | Zn ppm | Weight kg | Cu ppm | Pb ppm | Zn ppm | Weight kg | Cu ppm | Pb ppm | Zn ppm |
| 10 | 12 | 60 | 16.67 | 0 | 983 | 693 | 2079 | 0.91 | 880 | 510 | 2000 | 0.279 | 920 | 510 | 2000 | 0.180 | 1600 | 1900 | 2600 |
| 11 | 12 | 60 | 16.67 | 0 | 906 | 649 | 1927 | 0.7 | 820 | 530 | 1800 | 0.513 | 850 | 440 | 1900 | 0.180 | 1400 | 1700 | 2500 |
| 12 | 12 | 60 | 16.67 | 0 | 914 | 644 | 1934 | 1.19 | 860 | 560 | 1800 | 0.683 | 860 | 450 | 2000 | 0.172 | 1500 | 2000 | 2600 |
| 13 | 20 | 50 | 28.57 | 0 | 811 | 607 | 1879 | 1.82 | 740 | 490 | 1800 | 0.276 | 870 | 480 | 1900 | 0.191 | 1400 | 1900 | 2600 |
| 14 | 20 | 50 | 28.57 | 0 | 870 | 752 | 1906 | 1.27 | 730 | 480 | 1700 | 0.81 | 880 | 560 | 2000 | 0.233 | 1600 | 2900 | 2700 |
| 15 | 20 | 50 | 28.57 | 0 | 850 | 702 | 1926 | 0.85 | 720 | 490 | 1700 | 0.678 | 810 | 470 | 2000 | 0.211 | 1500 | 2300 | 2600 |
| 16 | 25 | 60 | 29.41 | 0 | 921.7 | 668.3 | 2004 | 2.5 | 829 | 495 | 1940 | 0.348 | 1000 | 584 | 2140 | 0.228 | 1820 | 2700 | 2510 |
| 17 | 25 | 60 | 29.41 | 0 | 937.8 | 710 | 2044 | 1.8 | 823 | 514 | 1980 | 0.78 | 916 | 518 | 2010 | 0.219 | 1960 | 3020 | 2700 |
| 18 | 25 | 60 | 29.41 | 0 | 932.7 | 720.6 | 2006 | 1.55 | 835 | 525 | 1940 | 1.147 | 885 | 501 | 1960 | 0.218 | 1880 | 3270 | 2730 |

TABLE 16

Cleaning coefficients of the spiral on the soil fraction defined in Table 15

| | Parameters | | | | Light fraction | | | | Middling | | | | Heavy fraction | | | | Output Cleaning | | |
|---|---|---|---|---|---|---|---|---|---|---|---|---|---|---|---|---|---|---|---|
| Trial | Solid kg/min | Pulp water l/min | % solid % | washing water (l/min) | Weight % | Cu % | Pb % | Zn % | Weight % | Cu % | Pb % | Zn % | Weight % | Cu % | Pb % | Zn % | Cu % | Pb % | Zn % |
| 10 | 33.3 | 50 | 39.98 | 0 | 66.47 | 59.51 | 48.92 | 63.95 | 20.38 | 19.074 | 15 | 19.61 | 13.15 | 21.4 | 36.05 | 16.44 | 10 | 26 | 4 |
| 11 | 33.3 | 50 | 39.98 | 0 | 50.25 | 45.48 | 41.04 | 46.94 | 36.83 | 34.551 | 24.97 | 36.31 | 12.92 | 19.97 | 33.85 | 16.76 | 9 | 18 | 7 |
| 12 | 33.3 | 50 | 39.98 | 0 | 58.19 | 54.75 | 50.6 | 54.16 | 33.4 | 31.425 | 23.34 | 34.54 | 8.41 | 13.8 | 26.12 | 11.31 | 6 | 13 | 7 |
| 13 | 33.3 | 50 | 30.47 | 0 | 79.58 | 72.61 | 64.24 | 76.23 | 12.07 | 12.946 | 9.543 | 12.2 | 8.35 | 14.42 | 26.14 | 11.56 | 9 | 19 | 4 |
| 14 | 33.3 | 50 | 30.47 | 0 | 54.91 | 46.07 | 35.05 | 48.97 | 35.02 | 35.422 | 26.08 | 36.75 | 10.07 | 18.53 | 38.85 | 14.27 | 16 | 36 | 11 |
| 15 | 33.3 | 50 | 30.47 | 0 | 48.88 | 41.4 | 34.12 | 43.14 | 38.99 | 37.153 | 26.1 | 40.49 | 12.13 | 21.41 | 39.75 | 16.38 | 15 | 30 | 12 |
| 16 | 25 | 60 | 29.41 | 0 | 81.27 | 73.1 | 60.2 | 78.68 | 11.31 | 12.275 | 9.887 | 12.08 | 7.41 | 14.64 | 29.95 | 9.284 | 10 | 26 | 3 |
| 17 | 25 | 60 | 29.41 | 0 | 64.31 | 56.44 | 46.56 | 62.3 | 27.87 | 27.221 | 20.33 | 27.4 | 7.82 | 16.35 | 33.28 | 10.34 | 12 | 28 | 3 |
| 18 | 25 | 60 | 29.41 | 0 | 53.17 | 47.6 | 38.74 | 51.42 | 39.35 | 37.336 | 27.36 | 38.45 | 7.48 | 15.07 | 33.94 | 10.18 | 10 | 27 | 3 |

TABLE 17

Operation parameters and ppm contents of the −300 +38 μm fraction of the soil

| | Parameters | | | | Calculated feed | | | Light fraction | | | | Middling | | | | Heavy fraction | | | |
|---|---|---|---|---|---|---|---|---|---|---|---|---|---|---|---|---|---|---|---|
| Trial | Solid kg/min | Pulp water l/min | % solid % | washing water (l/min) | Cu ppm | Pb ppm | Zn ppm | Weight kg | Cu ppm | Pb ppm | Zn ppm | Weight kg | Cu ppm | Pb ppm | Zn ppm | Weight kg | Cu ppm | Pb ppm | Zn ppm |
| 19 | 33.3 | 50 | 39.98 | 0 | 1306 | 1025 | 2849 | 3.19 | 1300 | 920 | 3000 | 0.735 | 1100 | 780 | 2300 | 0.217 | 2100 | 3400 | 2500 |
| 20 | 33.3 | 50 | 39.98 | 0 | 1307 | 1019 | 2833 | 3.07 | 1300 | 910 | 3000 | 0.568 | 1100 | 690 | 2200 | 0.355 | 1700 | 2500 | 2400 |
| 21 | 33.3 | 50 | 39.98 | 0 | 1324 | 1016 | 2826 | 2.86 | 1300 | 890 | 3000 | 0.376 | 1100 | 660 | 2300 | 0.563 | 1600 | 1900 | 2300 |
| 22 | 33.3 | 50 | 30.47 | 0 | 1307 | 1007 | 2750 | 2.91 | 1300 | 880 | 2900 | 0.739 | 1100 | 660 | 2200 | 0.175 | 2300 | 4600 | 2600 |
| 23 | 33.3 | 50 | 30.47 | 0 | 1298 | 1022 | 2822 | 2.9 | 1300 | 900 | 3000 | 0.564 | 1000 | 610 | 2100 | 0.330 | 1800 | 2800 | 2500 |
| 24 | 33.3 | 50 | 30.47 | 0 | 1391 | 1089 | 2923 | 2.94 | 1400 | 930 | 3100 | 0.433 | 1100 | 590 | 2200 | 0.487 | 1600 | 2500 | 2500 |

TABLE 18

Cleaning coefficients of the spiral on the soil fraction defined in Table 17

| | Parameters | | | | Light fraction | | | | Middling | | | |
|---|---|---|---|---|---|---|---|---|---|---|---|---|
| Trial | Solid kg/min | Pulp water l/min | % solid % | washing water (l/min) | Weight % | Cu % | Pb % | Zn % | Weight % | Cu % | Pb % | Zn % |
| 19 | 33.3 | 50 | 39.98 | 0 | 77 | 76.63 | 69.11 | 81.07 | 17.75 | 14.95 | 13.51 | 14.33 |
| 20 | 33.3 | 50 | 39.98 | 0 | 76.91 | 76.49 | 68.62 | 81.44 | 14.21 | 11.96 | 9.61 | 11.04 |
| 21 | 33.3 | 50 | 39.98 | 0 | 75.27 | 73.87 | 65.81 | 79.88 | 9.9 | 8.22 | 6.43 | 8.06 |
| 22 | 33.3 | 50 | 30.47 | 0 | 76.07 | 75.66 | 66.42 | 80.2 | 19.35 | 16.28 | 12.67 | 15.47 |
| 23 | 33.3 | 50 | 30.47 | 0 | 76.41 | 76.48 | 67.27 | 81.22 | 14.88 | 11.46 | 8.88 | 11.07 |
| 24 | 33.3 | 50 | 30.47 | 0 | 76.17 | 76.63 | 64.99 | 80.77 | 11.22 | 8.87 | 6.07 | 8.44 |

| | Heavy fraction | | | | Output cleaning | | | Middling cleaning | | |
|---|---|---|---|---|---|---|---|---|---|---|
| Trial | Weight % | Cu % | Pb % | Zn % | Cu % | Pb % | Zn % | Cu % | Pb % | Zn % |
| 19 | 5.24 | 8.43 | 17.38 | 4.6 | 0 | 10 | −5 | 16 | 24 | 19 |
| 20 | 8.88 | 11.55 | 21.77 | 7.52 | 1 | 11 | −6 | 16 | 32 | 22 |
| 21 | 14.83 | 17.91 | 27.7 | 12.06 | 2 | 12 | −6 | 17 | 35 | 19 |
| 22 | 4.58 | 8.06 | 20.91 | 4.33 | 1 | 13 | −5 | 16 | 34 | 20 |
| 23 | 8.71 | 12.07 | 23.85 | 7.71 | 0 | 12 | −6 | 23 | 40 | 26 |
| 24 | 12.62 | 14.51 | 28.94 | 10.79 | −1 | 15 | −6 | 21 | 46 | 25 |

TABLE 19

Operation parameters and ppm contents of the −106 +38 μm fraction of the soil

| | Parameters | | | | Calculated feed | | | Light fraction | | | | Middling | | | | Heavy fraction | | | |
|---|---|---|---|---|---|---|---|---|---|---|---|---|---|---|---|---|---|---|---|---|
| | Solid | Pulp water | % solid | washing water | Cu | Pb | Zn | Weight | Cu | Pb | Zn | Weight | Cu | Pb | Zn | Weight | Cu | Pb | Zn |
| Trial | kg/min | l/min | % | (l/min) | ppm | ppm | ppm | kg | ppm | ppm | ppm | kg | ppm | ppm | ppm | kg | ppm | ppm | ppm |
| 25 | 25 | 60 | 29.4 | 0 | 1300 | 1106 | 3025 | 2.41 | 1300 | 1000 | 3000 | 0.116 | 1100 | 890 | 3000 | 0.236 | 1400 | 2300 | 3300 |
| 26 | 25 | 60 | 29.4 | 0 | 1286 | 1097 | 3014 | 2.2 | 1300 | 990 | 3000 | 0.198 | 1000 | 800 | 2700 | 0.245 | 1400 | 2300 | 3400 |
| 27 | 25 | 60 | 29.4 | 0 | 1278 | 1087 | 2915 | 2.12 | 1300 | 990 | 2900 | 0.265 | 1000 | 790 | 2700 | 0.236 | 1400 | 2300 | 3300 |

TABLE 20

Cleaning coefficients of the spiral on the soil fraction defined in Table 19

| | Parameters | | | | Light fraction | | | | Middling | | | | Heavy fraction | | | | Output Cleaning | | |
|---|---|---|---|---|---|---|---|---|---|---|---|---|---|---|---|---|---|---|---|
| Trial | Solid kg/min | Pulp water l/min | % solid % | washing water (l/min) | Weight % | Cu % | Pb % | Zn % | Weight % | Cu % | Pb % | Zn % | Weight % | Cu % | Pb % | Zn % | Cu % | Pb % | Zn % |
| 25 | 25 | 60 | 29.4 | 0 | 77 | 76.63 | 69.11 | 81.07 | 17.75 | 14.95 | 13.51 | 14.33 | 5.24 | 8.43 | 17.38 | 4.6 | 0 | 10 | 1 |
| 26 | 25 | 60 | 29.4 | 0 | 76.91 | 76.49 | 68.62 | 81.44 | 14.21 | 11.96 | 9.61 | 11.04 | 8.88 | 11.55 | 21.77 | 7.52 | −1 | 10 | 0 |
| 27 | 25 | 60 | 29.4 | 0 | 75.27 | 73.87 | 65.81 | 79.88 | 9.9 | 8.22 | 6.43 | 8.06 | 14.83 | 17.91 | 27.7 | 12.06 | −2 | 9 | 1 |

TABLE 21

Operation parameters and ppm contents of the −1.7 +106 μm fraction of the soil

| | Parameters | | | | Calculated feed | | | Light fraction | | | | Middling | | | | Heavy fraction | | | |
|---|---|---|---|---|---|---|---|---|---|---|---|---|---|---|---|---|---|---|---|---|
| | Solid | Pulp water | % solid | washing water | Cu | Pb | Zn | Weight | Cu | Pb | Zn | Weight | Cu | Pb | Zn | Weight | Cu | Pb | Zn |
| Trial | kg/min | l/min | % | (l/min) | ppm | ppm | ppm | kg | ppm | ppm | ppm | kg | ppm | ppm | ppm | kg | ppm | ppm | ppm |
| 28 | 25 | 70 | 26.32 | 0 | 1625 | 970 | 1752 | 0.92 | 932 | 521 | 1580 | 1.291 | 1560 | 858 | 1780 | 0.217 | 4970 | 3550 | 2320 |
| 29 | 25 | 70 | 26.32 | 0 | 1477 | 814 | 1622 | 1.73 | 882 | 461 | 1470 | 1.103 | 1460 | 679 | 1540 | 0.255 | 5590 | 3800 | 3010 |
| 30 | 25 | 70 | 26.32 | 0 | 1631 | 856 | 1647 | 2.56 | 1200 | 624 | 1550 | 0.338 | 3880 | 897 | 2030 | 0.202 | 3340 | 3740 | 2240 |

TABLE 22

Cleaning coefficients of the spiral on the soil fraction defined in Table 21

| | Parameters | | | | Light fraction | | | | Middling | | | | Heavy fraction | | | | Output cleaning | | |
|---|---|---|---|---|---|---|---|---|---|---|---|---|---|---|---|---|---|---|---|
| Trial | Solid kg/min | Pulp water l/min | % solid % | washing water (l/min) | Weight % | Cu % | Pb % | Zn % | Weight % | Cu % | Pb % | Zn % | Weight % | Cu % | Pb % | Zn % | Cu % | Pb % | Zn % |
| 28 | 25 | 60 | 29.4 | 0 | 38 | 22 | 20 | 34 | 53.2 | 51 | 47 | 54 | 9 | 27 | 33 | 12 | 43 | 46 | 10 |
| 29 | 25 | 60 | 29.4 | 0 | 56 | 33 | 32 | 51 | 35.7 | 35 | 30 | 34 | 8 | 31 | 39 | 15 | 40 | 43 | 9 |
| 30 | 25 | 60 | 29.4 | 0 | 83 | 61 | 60 | 78 | 10.9 | 26 | 11 | 13 | 7 | 13 | 28 | 9 | 26 | 27 | 6 |

TABLE 23

Operation parameters and ppm contents of the −1.7 +300 μm fraction of the soil

| | Parameters | | | | | Calculated feed | | | Heavy fraction | | | | Light fraction | | | |
|---|---|---|---|---|---|---|---|---|---|---|---|---|---|---|---|---|
| Trial # | Solid kg/min | Pulp water l/min | % solid | Washing water l/min | Bed density g/cm$^3$ | Cu ppm | Pb ppm | Zn ppm | Weight kg | Cu ppm | Pb ppm | Zn ppm | Weight kg | Cu ppm | Pb ppm | Zn ppm |
| 1 | 3.33 | 3.33 | 50 | 35 | 1.72 | 402 | 1199 | 677 | 1.44 | 758 | 2416 | 934 | 2.45 | 193 | 484 | 526 |
| 2 | 3.33 | 3.33 | 50 | 38 | 1.68 | 1870 | 1363 | 3455 | 1.349 | 6600 | 4000 | 4000 | 4.723 | 520 | 610 | 3300 |
| 3 | 3.33 | 3.33 | 50 | 41 | 1.68 | 834 | 735 | 2646 | 0.64 | 3200 | 1600 | 3000 | 4.809 | 520 | 620 | 2600 |
| 4 | 3.33 | 3.33 | 50 | 44 | 1.68 | 1125 | 1154 | 2200 | 1.648 | 2200 | 2100 | 2200 | 3.501 | 620 | 710 | 2200 |
| 5 | 3.33 | 3.33 | 50 | 46 | 1.72 | 2089 | 834 | 1270 | 2.025 | 4200 | 1500 | 1600 | 3.92 | 1000 | 490 | 1100 |

TABLE 24

Cleaning coefficients of the fluidised bed classifier on the soil fraction defined in Table 23

| | Parameters | | | | | Heavy fraction | | | | Light fraction | | | | Cleaning | | |
|---|---|---|---|---|---|---|---|---|---|---|---|---|---|---|---|---|
| Trial # | Speed rpm | Pulp water l/min | % solid | Washing water l/min | Bed density g/cm$^3$ | Weight % | Cu % | Pb % | Zn % | Weight % | Cu % | Pb % | Zn % | Cu % | Pb % | Zn % |
| 1 | 200 | 1 | 6 | 5 | 15 | 37 | 70 | 75 | 51 | 63 | 30 | 25 | 49 | 52 | 60 | 22 |
| 2 | 250 | 1 | 6 | 5 | 15 | 22 | 78 | 65 | 26 | 78 | 22 | 35 | 74 | 72 | 55 | 4 |
| 3 | 300 | 1 | 6 | 5 | 15 | 12 | 45 | 26 | 13 | 88 | 55 | 74 | 87 | 38 | 16 | 2 |
| 4 | 300 | 3 | 6 | 5 | 15 | 32 | 63 | 58 | 32 | 68 | 37 | 42 | 68 | 45 | 38 | 0 |
| 5 | 250 | 3 | 6 | 5 | 15 | 34 | 68 | 61 | 43 | 66 | 32 | 39 | 57 | 52 | 41 | 13 |

TABLE 25

Operation parameters and ppm contents of the −300 +106 μm fraction of the soil

| | Parameters | | | | | | | Calculated feed | | | Light fraction | | | | Heavy fraction | | | |
|---|---|---|---|---|---|---|---|---|---|---|---|---|---|---|---|---|---|---|
| Trial # | Speed rpm | Washing l/min | Angle degree | Frequency cps | Amplitude mm | Feed l/min | % solid | Cu ppm | Pb ppm | Zn ppm | Weight g | Cu ppm | Pb ppm | Zn ppm | Weight g | Cu ppm | Pb ppm | Zn ppm |
| 1 | 175 | 1 | 6 | 5 | 15 | 3 | 30 | 822 | 569 | 1809 | 237 | 997 | 890 | 2170 | 611.7 | 755 | 445 | 1670 |
| 2 | 200 | 1 | 6 | 5 | 15 | 3 | 30 | 854 | 627 | 1854 | 376 | 917 | 737 | 2050 | 214.5 | 745 | 434 | 1510 |
| 3 | 250 | 1 | 6 | 5 | 15 | 3 | 30 | 875 | 610 | 1909 | 774 | 889 | 634 | 1980 | 108.1 | 782 | 442 | 1400 |
| 4 | 175 | 3 | 6 | 5 | 15 | 3 | 30 | 921 | 715 | 1945 | 300 | 1180 | 1180 | 2320 | 638.9 | 800 | 497 | 1770 |
| 5 | 200 | 3 | 6 | 5 | 15 | 3 | 30 | 890 | 626 | 1934 | 355 | 1020 | 827 | 2260 | 367.2 | 766 | 432 | 1620 |
| 6 | 250 | 3 | 6 | 5 | 15 | 3 | 30 | 875 | 611 | 1851 | 456 | 930 | 685 | 2010 | 175.3 | 732 | 421 | 1440 |
| 7 | 175 | 5 | 6 | 5 | 15 | 3 | 30 | 896 | 604 | 1820 | 27.7 | 1510 | 3020 | 2530 | 634.4 | 869 | 499 | 1790 |
| 8 | 200 | 5 | 6 | 5 | 15 | 3 | 30 | 866 | 618 | 1898 | 364 | 1000 | 816 | 2220 | 451.8 | 757 | 460 | 1640 |
| 9 | 250 | 5 | 6 | 5 | 15 | 3 | 30 | 862 | 609 | 1835 | 442 | 910 | 684 | 2000 | 175.2 | 744 | 422 | 1420 |

TABLE 26

Cleaning coefficients of the multi-gravity separator on the soil fraction defined in Table 25

| | Parameters | | | | | | | Light fraction | | | | Heavy fraction | | | | Cleaning | | |
|---|---|---|---|---|---|---|---|---|---|---|---|---|---|---|---|---|---|---|
| Trial # | Speed rpm | Washing l/min | Angle degree | Frequency cps | Amplitude mm | Feed l/min | % solid | Weight % | Cu % | Pb % | Zn % | Weight % | Cu % | Pb % | Zn % | Cu % | Pb % | Zn % |
| 1 | 175 | 1 | 6 | 5 | 15 | 3 | 30 | 28 | 34 | 44 | 33 | 72 | 66 | 56 | 67 | 8 | 22 | 8 |
| 2 | 200 | 1 | 6 | 5 | 15 | 3 | 30 | 64 | 68 | 75 | 70 | 36 | 32 | 25 | 30 | 13 | 31 | 19 |
| 3 | 250 | 1 | 6 | 5 | 15 | 3 | 30 | 88 | 89 | 91 | 91 | 12 | 11 | 9 | 9 | 11 | 28 | 27 |
| 4 | 175 | 3 | 6 | 5 | 15 | 3 | 30 | 32 | 41 | 53 | 38 | 68 | 59 | 47 | 62 | 13 | 30 | 9 |

TABLE 26-continued

Cleaning coefficients of the multi-gravity separator on the soil fraction defined in Table 25

| | Parameters | | | | | | | Light fraction | | | | Heavy fraction | | | | Cleaning | | |
|---|---|---|---|---|---|---|---|---|---|---|---|---|---|---|---|---|---|---|
| Trial # | Speed rpm | Washing l/min | Angle degree | Frequency cps | Amplitude mm | Feed l/min | % solid | Weight % | Cu % | Pb % | Zn % | Weight % | Cu % | Pb % | Zn % | Cu % | Pb % | Zn % |
| 5 | 200 | 3 | 6 | 5 | 15 | 3 | 30 | 49 | 56 | 65 | 57 | 51 | 44 | 35 | 43 | 14 | 31 | 16 |
| 6 | 250 | 3 | 6 | 5 | 15 | 3 | 30 | 72 | 77 | 81 | 78 | 28 | 23 | 19 | 22 | 16 | 31 | 22 |
| 7 | 175 | 5 | 6 | 5 | 15 | 3 | 30 | 4 | 7 | 21 | 6 | 96 | 93 | 79 | 94 | 3 | 17 | 2 |
| 8 | 200 | 5 | 6 | 5 | 15 | 3 | 30 | 45 | 52 | 59 | 52 | 55 | 48 | 41 | 48 | 13 | 26 | 14 |
| 9 | 250 | 5 | 6 | 5 | 15 | 3 | 30 | 72 | 76 | 80 | 78 | 28 | 25 | 20 | 22 | 14 | 31 | 23 |

TABLE 27

Operation parameters and ppm contents of the −106 +38 μm fraction of the soil

| | Parameters | | | | | | | Calculated feed | | | Heavy fraction | | | | Light fraction | | | |
|---|---|---|---|---|---|---|---|---|---|---|---|---|---|---|---|---|---|---|
| Trial # | Speed rpm | Washing l/min | Angle degree | Frequency cps | Amplitude mm | Feed l/min | % solid | Cu ppm | Pb ppm | Zn ppm | Weight g | Cu ppm | Pb ppm | Zn ppm | Weight g | Cu ppm | Pb ppm | Zn ppm |
| 10 | 150 | 1 | 6 | 5 | 15 | 3 | 30 | 1332 | 1006 | 2991 | 52 | 1200 | 2390 | 3750 | 958 | 1340 | 931 | 2950 |
| 11 | 200 | 1 | 6 | 5 | 15 | 3 | 30 | 1540 | 1107 | 3200 | 615 | 854 | 808 | 2540 | 406 | 2580 | 1560 | 4200 |
| 12 | 250 | 1 | 6 | 5 | 15 | 3 | 30 | 1235 | 962 | 2919 | 671 | 854 | 791 | 2570 | 296 | 2100 | 1350 | 3710 |
| 13 | 150 | 3 | 6 | 5 | 15 | 3 | 30 | 1360 | 1054 | 3035 | 176 | 1190 | 1460 | 3450 | 760 | 1400 | 960 | 2940 |
| 14 | 200 | 3 | 6 | 5 | 15 | 3 | 30 | 1396 | 1085 | 3116 | 463 | 890 | 907 | 2710 | 424 | 1950 | 1280 | 3560 |
| 15 | 250 | 3 | 6 | 5 | 15 | 3 | 30 | 1497 | 1144 | 3214 | 596 | 843 | 876 | 2570 | 414 | 2440 | 1530 | 4140 |
| 16 | 150 | 5 | 6 | 5 | 15 | 3 | 30 | 1411 | 1052 | 3160 | 15 | 1490 | 3520 | 4680 | 1134 | 1410 | 1020 | 3140 |
| 17 | 200 | 5 | 6 | 5 | 15 | 3 | 30 | 1432 | 1114 | 3229 | 471 | 898 | 905 | 2690 | 562 | 1880 | 1290 | 3680 |
| 18 | 250 | 5 | 6 | 5 | 15 | 3 | 30 | 1438 | 1106 | 3142 | 613 | 847 | 867 | 2620 | 416 | 2310 | 1460 | 3910 |

TABLE 28

Cleaning coefficients of the multi-gravity separator on the soil fraction defined in Table 27

| | Parameters | | | | | | | Heavy fraction | | | | Light fraction | | | | Cleaning | | |
|---|---|---|---|---|---|---|---|---|---|---|---|---|---|---|---|---|---|---|
| Trial # | Speed rpm | Washing l/min | Angle degree | Frequency cps | Amplitude mm | Feed l/min | % solid | Weight % | Cu % | Pb % | Zn % | Weight % | Cu % | Pb % | Zn % | Cu % | Pb % | Zn % |
| 10 | 150 | 1 | 6 | 5 | 15 | 3 | 30 | 5 | 5 | 12 | 6 | 95 | 95 | 88 | 94 | 10 | −138 | −25 |
| 11 | 200 | 1 | 6 | 5 | 15 | 3 | 30 | 60 | 33 | 44 | 48 | 40 | 67 | 56 | 52 | 45 | 27 | 21 |
| 12 | 250 | 1 | 6 | 5 | 15 | 3 | 30 | 69 | 48 | 57 | 61 | 31 | 52 | 43 | 39 | 31 | 18 | 12 |
| 13 | 150 | 3 | 6 | 5 | 15 | 3 | 30 | 19 | 16 | 26 | 21 | 81 | 84 | 74 | 79 | 13 | −39 | −14 |
| 14 | 200 | 3 | 6 | 5 | 15 | 3 | 30 | 52 | 33 | 44 | 45 | 48 | 67 | 56 | 55 | 36 | 16 | 13 |
| 15 | 250 | 3 | 6 | 5 | 15 | 3 | 30 | 59 | 33 | 45 | 47 | 41 | 67 | 55 | 53 | 44 | 23 | 20 |
| 16 | 150 | 5 | 6 | 5 | 15 | 3 | 30 | 1 | 1 | 4 | 2 | 99 | 99 | 96 | 98 | −6 | −235 | −48 |
| 17 | 200 | 5 | 6 | 5 | 15 | 3 | 30 | 46 | 29 | 37 | 38 | 54 | 71 | 63 | 62 | 37 | 19 | 17 |
| 18 | 250 | 5 | 6 | 5 | 15 | 3 | 30 | 60 | 35 | 47 | 50 | 40 | 65 | 53 | 50 | 41 | 22 | 17 |

TABLE 29

Operation parameters and ppm contents of the −106 μm fraction of the soil

| | Parameters | | | | | | | Calculated feed | | | Heavy fraction | | | | Light fraction | | | |
|---|---|---|---|---|---|---|---|---|---|---|---|---|---|---|---|---|---|---|
| Trial # | Speed rpm | Washing l/min | Angle degree | Frequency cps | Amplitude mm | Feed l/min | % solid | Cu ppm | Pb ppm | Zn ppm | Weight g | Cu ppm | Pb ppm | Zn ppm | Weight g | Cu ppm | Pb ppm | Zn ppm |
| 19 | 200 | 1 | 6 | 5 | 15 | 3 | 30 | 1591 | 1236 | 3816 | 346 | 758 | 752 | 2280 | 826 | 1940 | 1440 | 4460 |
| 20 | 250 | 1 | 6 | 5 | 15 | 3 | 30 | 1611 | 1266 | 3874 | 521 | 732 | 770 | 2400 | 612 | 2360 | 1690 | 5130 |
| 21 | 300 | 1 | 6 | 5 | 15 | 3 | 30 | 1565 | 1233 | 3741 | 647 | 833 | 864 | 2590 | 472 | 2570 | 1740 | 5320 |
| 22 | 200 | 3 | 6 | 5 | 15 | 3 | 30 | 1591 | 1254 | 3835 | 305 | 804 | 802 | 2350 | 833 | 1880 | 1420 | 4380 |
| 23 | 250 | 3 | 6 | 5 | 15 | 3 | 30 | 1567 | 1244 | 3730 | 408 | 742 | 777 | 2390 | 644 | 2090 | 1540 | 4580 |
| 24 | 300 | 3 | 6 | 5 | 15 | 3 | 30 | 1603 | 1276 | 3880 | 556 | 765 | 816 | 2450 | 564 | 2430 | 1730 | 5290 |
| 25 | 200 | 5 | 6 | 5 | 15 | 3 | 30 | 1595 | 1264 | 3871 | 267 | 890 | 866 | 2430 | 920 | 1800 | 1380 | 4290 |
| 26 | 250 | 5 | 6 | 5 | 15 | 3 | 30 | 1515 | 1203 | 3625 | 412 | 748 | 764 | 2380 | 680 | 1980 | 1470 | 4380 |
| 27 | 300 | 5 | 6 | 5 | 15 | 3 | 30 | 1493 | 1177 | 3592 | 499 | 683 | 762 | 2210 | 606 | 2160 | 1520 | 4730 |

TABLE 30

Cleaning coefficients of the multi-gravity separator on the soil fraction defined in Table 29

| | Parameters | | | | | | | Heavy fraction | | | | Light fraction | | | | Cleaning | | |
|---|---|---|---|---|---|---|---|---|---|---|---|---|---|---|---|---|---|---|
| Trial # | Speed rpm | Washing l/min | Angle degree | Frequency cps | Amplitude mm | Feed l/min | % solid | Weight % | Cu % | Pb % | Zn % | Weight % | Cu % | Pb % | Zn % | Cu % | Pb % | Zn % |
| 19 | 200 | 1 | 6 | 5 | 15 | 3 | 30 | 30 | 14 | 18 | 18 | 70 | 86 | 82 | 82 | 52 | 39 | 40 |
| 20 | 250 | 1 | 6 | 5 | 15 | 3 | 30 | 46 | 21 | 28 | 28 | 54 | 79 | 72 | 72 | 55 | 39 | 38 |
| 21 | 300 | 1 | 6 | 5 | 15 | 3 | 30 | 58 | 31 | 41 | 40 | 42 | 69 | 60 | 60 | 47 | 30 | 31 |
| 22 | 200 | 3 | 6 | 5 | 15 | 3 | 30 | 27 | 14 | 17 | 16 | 73 | 86 | 83 | 84 | 49 | 36 | 39 |
| 23 | 250 | 3 | 6 | 5 | 15 | 3 | 30 | 39 | 18 | 24 | 25 | 61 | 82 | 76 | 75 | 53 | 38 | 36 |
| 24 | 300 | 3 | 6 | 5 | 15 | 3 | 30 | 50 | 24 | 32 | 31 | 50 | 76 | 68 | 69 | 52 | 36 | 37 |
| 25 | 200 | 5 | 6 | 5 | 15 | 3 | 30 | 22 | 13 | 15 | 14 | 78 | 87 | 85 | 86 | 44 | 31 | 37 |
| 26 | 250 | 5 | 6 | 5 | 15 | 3 | 30 | 38 | 19 | 24 | 25 | 62 | 81 | 76 | 75 | 51 | 36 | 34 |
| 27 | 300 | 5 | 6 | 5 | 15 | 3 | 30 | 45 | 21 | 29 | 28 | 55 | 79 | 71 | 72 | 54 | 35 | 38 |

TABLE 31

Operation parameters and ppm contents of the −38 μm fraction of the soil

| | Parameters | | | | | | | Calculated feed | | | Heavy fraction | | | | Light fraction | | | |
|---|---|---|---|---|---|---|---|---|---|---|---|---|---|---|---|---|---|---|
| Trial # | Speed rpm | Washing l/min | Angle degree | Frequency cps | Amplitude mm | Feed l/min | % solid | Cu ppm | Pb ppm | Zn ppm | Weight g | Cu ppm | Pb ppm | Zn ppm | Weight g | Cu ppm | Pb ppm | Zn ppm |
| 28 | 200 | 1 | 6 | 5 | 15 | 3 | 30 | 1604 | 1375 | 4190 | 212 | 700 | 800 | 2300 | 980 | 1800 | 1500 | 4600 |
| 29 | 250 | 1 | 6 | 5 | 15 | 3 | 30 | 1547 | 1395 | 4188 | 406 | 710 | 830 | 2500 | 752 | 2000 | 1700 | 5100 |
| 30 | 300 | 1 | 6 | 5 | 15 | 3 | 30 | 1751 | 1509 | 4635 | 547 | 840 | 960 | 3000 | 768 | 2400 | 1900 | 5800 |
| 31 | 200 | 3 | 6 | 5 | 15 | 3 | 30 | 1597 | 1364 | 4254 | 472 | 780 | 910 | 2700 | 640 | 2200 | 1700 | 5400 |
| 32 | 250 | 3 | 6 | 5 | 15 | 3 | 30 | 1634 | 1403 | 4276 | 380 | 690 | 800 | 2400 | 772 | 2100 | 1700 | 5200 |
| 33 | 300 | 3 | 6 | 5 | 15 | 3 | 30 | 1654 | 1407 | 4372 | 150 | 690 | 790 | 2200 | 996 | 1800 | 1500 | 4700 |
| 34 | 200 | 5 | 6 | 5 | 15 | 3 | 30 | 1614 | 1447 | 4394 | 121 | 750 | 910 | 2300 | 1230 | 1700 | 1500 | 4600 |
| 35 | 250 | 5 | 6 | 5 | 15 | 3 | 30 | 1645 | 1424 | 4362 | 273 | 670 | 750 | 2300 | 1048 | 1900 | 1600 | 4900 |
| 36 | 300 | 5 | 6 | 5 | 15 | 3 | 30 | 1622 | 1402 | 4279 | 422 | 750 | 860 | 2600 | 770 | 2100 | 1700 | 5200 |

TABLE 32

Cleaning coefficients of the multi-gravity separator on the soil fraction defined in Table 31

| | Parameters | | | | | | Heavy fraction | | | | Light fraction | | | | Cleaning | | |
|---|---|---|---|---|---|---|---|---|---|---|---|---|---|---|---|---|---|
| Trial # | Speed rpm | Washing l/min | Angle degree | Frequency cps | Amplitude mm | Feed l/min | % solid | Weight % | Cu % | Pb % | Zn % | Weight % | Cu % | Pb % | Zn % | Cu % | Pb % | Zn % |
| 28 | 200 | 1 | 6 | 5 | 15 | 3 | 30 | 18 | 8 | 10 | 10 | 82 | 92 | 90 | 90 | 56 | 42 | 45 |
| 29 | 250 | 1 | 6 | 5 | 15 | 3 | 30 | 35 | 16 | 21 | 21 | 65 | 84 | 79 | 79 | 54 | 41 | 40 |
| 30 | 300 | 1 | 6 | 5 | 15 | 3 | 30 | 42 | 20 | 26 | 27 | 58 | 80 | 74 | 73 | 52 | 36 | 35 |
| 31 | 200 | 3 | 6 | 5 | 15 | 3 | 30 | 42 | 21 | 28 | 27 | 58 | 79 | 72 | 73 | 51 | 33 | 37 |
| 32 | 250 | 3 | 6 | 5 | 15 | 3 | 30 | 33 | 14 | 19 | 19 | 67 | 86 | 81 | 81 | 58 | 43 | 44 |
| 33 | 300 | 3 | 6 | 5 | 15 | 3 | 30 | 13 | 5 | 7 | 7 | 87 | 95 | 93 | 93 | 58 | 44 | 50 |
| 34 | 200 | 5 | 6 | 5 | 15 | 3 | 30 | 9 | 4 | 6 | 5 | 91 | 96 | 94 | 95 | 54 | 37 | 48 |
| 35 | 250 | 5 | 6 | 5 | 15 | 3 | 30 | 21 | 8 | 11 | 11 | 79 | 92 | 89 | 89 | 59 | 47 | 47 |
| 36 | 300 | 5 | 6 | 5 | 15 | 3 | 30 | 35 | 16 | 22 | 22 | 65 | 84 | 78 | 79 | 54 | 39 | 39 |

TABLE 33

Operation parameters and ppm contents of the −38 μm fraction of the soil

| | Parameters | | | | | | | Calculated feed$^{-2}$ | | | Light fraction | | | | Heavy fraction | | | |
|---|---|---|---|---|---|---|---|---|---|---|---|---|---|---|---|---|---|---|
| Trial # | Speed rpm | Washing l/min | Angle degree | Frequency cps | Amplitude mm | Feed l/min | % solid | Cu ppm | Pb ppm | Zn ppm | Weight g | Cu ppm | Pb ppm | Zn ppm | Weight g | Cu ppm | Pb ppm | Zn ppm |
| 1 | 200 | 1 | 6 | 5 | 15 | 3 | 30 | 567 | 1768 | 1451 | 1062 | 580 | 1700 | 1500 | 65.3 | 360 | 2888 | 662 |
| 2 | 250 | 1 | 6 | 5 | 15 | 3 | 30 | 542 | 1775 | 1444 | 796 | 680 | 2000 | 1800 | 375 | 250 | 1300 | 690 |
| 3 | 300 | 1 | 6 | 5 | 15 | 3 | 30 | 574 | 1791 | 1522 | 677 | 770 | 2100 | 2000 | 425 | 262 | 1300 | 763 |
| 4 | 300 | 3 | 6 | 5 | 15 | 3 | 30 | 568 | 1766 | 1528 | 564 | 760 | 2100 | 2000 | 330 | 240 | 1197 | 721 |
| 5 | 250 | 3 | 6 | 5 | 15 | 3 | 30 | 574 | 1764 | 1528 | 929 | 680 | 1900 | 1800 | 272 | 212 | 1300 | 600 |
| 6 | 200 | 3 | 6 | 5 | 15 | 3 | 30 | 580 | 1759 | 1464 | 1162 | 590 | 1700 | 1500 | 51.1 | 371 | 3114 | 663 |
| 7 | 200 | 5 | 6 | 5 | 15 | 3 | 30 | 566 | 1751 | 1479 | 1163 | 570 | 1700 | 1500 | 31.3 | 439 | 3700 | 712 |
| 8 | 250 | 5 | 6 | 5 | 15 | 3 | 30 | 562 | 1836 | 1513 | 851 | 670 | 2000 | 1800 | 260 | 210 | 1300 | 579 |
| 9 | 300 | 5 | 6 | 5 | 15 | 3 | 30 | 550 | 1756 | 1431 | 787 | 710 | 2000 | 1800 | 420 | 251 | 1300 | 740 |

TABLE 34

Cleaning coefficients of the multi-gravity separator on the soil fraction defined in Table 33

| | Parameters | | | | | | | Light fraction | | | | Heavy fraction | | | | Cleaning | | |
|---|---|---|---|---|---|---|---|---|---|---|---|---|---|---|---|---|---|---|
| Trial # | Speed rpm | Washing l/min | Angle degree | Frequency cps | Amplitude mm | Feed l/min | % solid | Weight % | Cu % | Pb % | Zn % | Weight % | Cu % | Pb % | Zn % | Cu % | Pb % | Zn % |
| 1 | 200 | 1 | 6 | 5 | 15 | 3 | 30 | 94 | 96 | 91 | 97 | 6 | 4 | 9 | 3 | 37 | −63 | 54 |
| 2 | 250 | 1 | 6 | 5 | 15 | 3 | 30 | 68 | 85 | 77 | 85 | 32 | 15 | 23 | 15 | 54 | 27 | 52 |
| 3 | 300 | 1 | 6 | 5 | 15 | 3 | 30 | 61 | 82 | 72 | 81 | 39 | 18 | 28 | 19 | 54 | 27 | 50 |
| 4 | 300 | 3 | 6 | 5 | 15 | 3 | 30 | 63 | 84 | 75 | 83 | 37 | 16 | 25 | 17 | 58 | 32 | 53 |
| 5 | 250 | 3 | 6 | 5 | 15 | 3 | 30 | 77 | 92 | 83 | 91 | 23 | 8 | 17 | 9 | 63 | 26 | 61 |
| 6 | 200 | 3 | 6 | 5 | 15 | 3 | 30 | 96 | 97 | 93 | 98 | 4 | 3 | 7 | 2 | 36 | −77 | 55 |
| 7 | 200 | 5 | 6 | 5 | 15 | 3 | 30 | 97 | 98 | 95 | 99 | 3 | 2 | 6 | 1 | 22 | −111 | 52 |
| 8 | 250 | 5 | 6 | 5 | 15 | 3 | 30 | 77 | 91 | 83 | 91 | 23 | 9 | 17 | 9 | 63 | 29 | 62 |
| 9 | 300 | 5 | 6 | 5 | 15 | 3 | 30 | 65 | 84 | 74 | 82 | 35 | 16 | 26 | 18 | 54 | 26 | 48 |

TABLE 35

Operation parameters and ppm contents of the −300 + 38 μm fraction of the soil
and cleaning coefficients of the multigravity separator

| Trial # | Parameters | | | | Consumption (g/t) | | | | |
|---|---|---|---|---|---|---|---|---|---|
| | Feed | Attrition | | pH | Kerosene | Procol ™ Ca-817 | CuSO$_4$.5H$_2$O | Procol ™ Ca-821 | MIBC |
| | | % solids | Length (min) | | | | | | |
| 1 | −300 + 38 μm | 70 | 15 | natural | 24 | 107 | 593 | 59 | 20 |
| 2 | −300 + 38 μm | 60 | 15 | natural | 0 | 66 | 658 | 33 | 8 |
| 3 | −300 + 38 μm | 60 | 15 | natural | 20 | 150 | 0 | 50 | 17 |
| 6 | −300 + 38 μm | Crushing 2 min | | natural | 0 | 100 | 500 | 0 | 17 |
| 7 | −300 + 38 μm | 60 | 15 | natural | 0 | 200 | 1000 | 0 | 29 |
| 9 | −300 + 38 μm | 60 | 15 | natural | 0 | 200 | 1500 | 0 | 25 |
| 10 | −300 + 38 μm | 60 | 15 | natural | 0 | 200 | 2000 | 0 | 25 |
| 11 | −300 + 38 μm | 60 | 30 | natural | 0 | 200 | 2000 | 0 | 25 |
| 12 | −300 + 38 μm | 60 | 30 | natural | 0 | 200 | 1500 | 0 | 25 |
| 13 | −300 + 38 μm | Crushing 2 min | | 9 | 0 | 100 | 500 | 0 | 25 |
| 14 | −300 + 38 μm | Crushing 2 min | | 10 | 0 | 100 | 500 | 0 | 25 |
| 15 | −300 + 38 μm | Crushing 2 min | | 11.5 | 0 | 100 | 500 | 0 | 25 |
| 16 | −300 + 38 μm | 60 | 15 | 9 | 0 | 200 | 1500 | 0 | 25 |
| 17 | −300 + 38 μm | 60 | 15 | 10.5 | 0 | 200 | 1500 | 0 | 17 |
| 18 | −300 + 38 μm | 60 | 15 | 11.5 | 0 | 200 | 1500 | 0 | 25 |
| 21 | −300 + 38 μm | Crushing 2 min | | 12 | 0 | 100 | 500 | 0 | 25 |
| 22 | −300 + 38 μm | 60 | 15 | 10.5 | 0 | 350 | 1500 | 0 | 17 |
| 23 | −300 + 38 μm | 60 | 15 | 10 | 0 | 300 | 4000 | 0 | 17 |
| 24 | −300 + 38 μm | 60 | 15 | 10.5 | 0 | 350 | 1500 | 0 | 17 |
| 25 | −300 + 38 μm | 60 | 15 | 10.5 | 0 | 500 | 3000 | 0 | 64 |

| Trial # | Feed | | | Output | | | | Cleaning | | |
|---|---|---|---|---|---|---|---|---|---|---|
| | Cu (ppm) | Pb (ppm) | Zn (ppm) | Weight % | Cu (ppm) | Pb (ppm) | Zn (ppm) | Cu (%) | Pb (%) | Zn (%) |
| 1 | 977 | 884 | 2192 | 89.7 | 838 | 796 | 1899 | 14 | 10 | |
| 2 | 886 | 777 | 1999 | 96.4 | 816 | 739 | 1841 | 8 | 5 | 8 |
| 3 | n.a. | n.a. | n.a. | 93.8 | n.a | n.a. | n.a. | n.a. | n.a. | n.a. |
| 6 | 867 | 714 | 1766 | 95.0 | 780 | 670 | 1600 | 10 | 6 | 9 |
| 7 | 947 | 721 | 1794 | 93.4 | 860 | 700 | 1700 | 9 | 3 | 5 |
| 9 | 979 | 663 | 1688 | 89.5 | 830 | 640 | 1600 | 15 | 3 | 5 |
| 10 | 1135 | 704 | 1629 | 92.6 | 970 | 680 | 1500 | 15 | 3 | 8 |
| 11 | 1161 | 809 | 1675 | 93.5 | 960 | 770 | 1500 | 17 | 5 | 10 |
| 12 | 1028 | 712 | 1669 | 93.2 | 850 | 670 | 1500 | 17 | 6 | 10 |
| 13 | 771 | 690 | 1691 | 92.1 | 660 | 650 | 1500 | 14 | 6 | 11 |
| 14 | 529 | 613 | 1517 | 91.5 | 410 | 570 | 1300 | 22 | 7 | 14 |
| 15 | 455 | 625 | 1488 | 88.0 | 350 | 600 | 1300 | 23 | 4 | 13 |
| 16 | 1002 | 569 | 1471 | 91.5 | 880 | 550 | 1300 | 12 | 3 | 12 |
| 17 | 756 | 755 | 1728 | 94.9 | 650 | 760 | 1600 | 14 | −1 | 7 |
| 18 | 833 | 628 | 1648 | 94.7 | 720 | 630 | 1500 | 14 | 0 | 9 |
| 21 | 721 | 621 | 1714 | 94.2 | 600 | 630 | 1500 | 17 | −1 | |
| 22 | 1042 | 628 | 1638 | 78.4 | 640 | 570 | 1400 | 39 | 9 | 15 |
| 23 | 680 | 711 | 1836 | 89.3 | 570 | 640 | 1600 | 16 | 10 | 13 |
| 24 | 1308 | 662 | 1759 | 74.4 | 690 | 580 | 1400 | 47 | 12 | 20 |
| 25 | 1921 | 658 | 1792 | 67.2 | 1100 | 520 | 1300 | 43 | 21 | 27 |

TABLE 36

Operation parameters and ppm contents of the −38 μm fraction of the
soil and cleaning coefficients of the multi-gravity separator

| Trial # | Parameters | | | Consumption (g/t) | | | | |
|---|---|---|---|---|---|---|---|---|
| | Feed | Attrition | | Kerosene | Procol ™ Ca-817 | CuSO$_4$.5H$_2$O | Procol ™ Ca-821 | MIBC |
| | | % solids | Length (min) | | | | | |
| 4 | −38 μm | 60 | 15 | 20 | 90 | 500 | 50 | 25 |
| 5 | −38 μm | 60 | 30 | 20 | 90 | 500 | 50 | 21 |
| 8 | −38 μm | 60 | 30 | 0 | 100 | 1000 | 0 | 17 |
| 19 | −38 μm | 60 | 30 | 0 | 119 | 1186 | 0 | 30 |
| 20 | −38 μm | 60 | 30 | 0 | 100 | 1000 | 0 | 25 |

TABLE 36-continued

Operation parameters and ppm contents of the −38 μm fraction of the soil and cleaning coefficients of the multi-gravity separator

| | Feed | | | | Output | | | Cleaning$^{-1}$ | | |
|---|---|---|---|---|---|---|---|---|---|---|
| Trial # | Cu (ppm) | Pb (ppm) | Zn (ppm) | Weight % | Cu (ppm) | Pb (ppm) | Zn (ppm) | Cu (%) | Pb (%) | Zn (%) |
| 4 | 2145 | 1661 | 5300 | 50.9 | 1900 | 1400 | 4500 | 11 | 16 | 15 |
| 5 | 1824 | 1428 | 4427 | 66.0 | 1700 | 1300 | 4000 | 7 | 9 | |
| 8 | 1911 | 1514 | 4460 | 81.0 | 1800 | 1300 | 4200 | 6 | 14 | |
| 19 | 2034 | 1449 | 4992 | 53.6 | 1600 | 1200 | 4000 | 21 | 17 | 20 |
| 20 | 1872 | 1609 | 5327 | 48.6 | 1400 | 1600 | 4900 | 25 | 1 | 8 |

TABLE 37

Summary table of long-term trials results presented in Tables 39 to 41

| Granulometric fractions mm$^{-1}$ | Weight Distribution$^{-2}$ % | Equipment used | Output/Feed % | Output Weight distribution % | Feed Contents | | | Cleaning coefficient$^{-1}$ | | | Elements distribution | | | Output content | | |
|---|---|---|---|---|---|---|---|---|---|---|---|---|---|---|---|---|
| | | | | | Cu ppm | Pb ppm | Zn ppm | Cu % | Pb % | Zn % | Cu % | Pb % | Zn % | Cu ppm | Pb ppm | Zn ppm |
| +6.4 | 37.9 | vibrating screen | 100 | 38 | 254 | 390 | 1900 | N/A | N/A | N/A | 14.3 | 31.7 | 31.4 | 254 | 390 | 1900 |
| −6.4 + 1.68 | 14.9 | jigs | 96.4 | 14 | 823 | 291 | 1654 | 75 | 42 | 20 | 18.2 | 9.3 | 10.7 | 206 | 169 | 1330 |
| −1.68 + 106 μm | 19.7 | spirals | 58.7 | 12 | 1025 | 455 | 1716 | 54 | 40 | 6 | 29.9 | 19.2 | 14.7 | 472 | 271 | 1622 |
| −106 μm | 27.5 | MGS | 52 | 14 | 924 | 673 | 3593 | 47 | 33 | 42 | 37.6 | 39.7 | 43.1 | 490 | 454 | 2098 |

1: Cleaning coefficient (1 − (Output content/Feed content)) × 100

TABLE 38

Comparison between optimisation results and long term trials

| | Soils, Trials optimisation | | | Soils, Trial long-term | | |
|---|---|---|---|---|---|---|
| Elements | Feed ppm | Output ppm | Cleaning coefficient$^{-1}$ % | Feed ppm | Output ppm | Cleaning coefficient$^{-1}$ % |
| Cu | 950 | 419 | 56 | 675 | 321 | 52 |
| Pb | 994 | 399 | 60 | 466 | 344 | 26 |
| Zn | 1869 | 1483 | 21 | 2293 | 1793 | 22 |

1: Cleaning coefficient (1 − (Output content/Feed content)) × 100

TABLE 39

Cleaning coefficients with jigs in long-term trials

| | JIG 1 | | | JIG 2 | | | Cleaning % | Output/Feed % | Cleaning coefficient[1] % | Output/Feed % | Cleaning coefficient[1], opt % |
|---|---|---|---|---|---|---|---|---|---|---|---|
| Parameters | Feed | Output | Concentrate | Feed$^{-1}$ | Output | Concentrate | | | | | |
| Weight (kg) | 1061.31 | 1032 | 29.31 | 1026.4 | 1016 | 8.4 | NA | 96 | NA | 96 | NA |
| Cu (ppm) | 823 | 246 | 18700 | 246 | 206 | 5030 | 75 | 96 | 75 | NA | 70 |
| Pb (ppm) | 291 | 183 | 6680 | 183 | 169 | 1750 | 42 | 96 | 42 | NA | 70 |
| Zn (ppm) | 1654 | 1354 | 7060 | 1354 | 1330 | 4220 | 20 | 96 | 20 | NA | 15 |

TABLE 40

Cleaning coefficients with spirals in long-term trials

| Parameters | SUBSAMPLE 1 | | | | SUBSAMPLE 2 | | | | SUBSAMPLE 3 | | | |
|---|---|---|---|---|---|---|---|---|---|---|---|---|
| | Feed | Output | Middling | Concentrate | Feed | Output | Middling | Concentrate | Feed | Output | Middling | Concentrate |
| Weight (g) | 2664 | 1525 | 888 | 251 | 2757 | 1535 | 963 | 259 | 2701 | 1629 | 825 | 247 |
| Cu (ppm) | 972 | 489 | 707 | 4840 | 963 | 462 | 1170 | 3170 | 916 | 381 | 1110 | 3800 |
| Pb (ppm) | 476 | 277 | 295 | 2330 | 455 | 288 | 247 | 2220 | 400 | 232 | 210 | 2140 |
| Zn (ppm) | 1663 | 1600 | 1470 | 2730 | 1689 | 1540 | 1660 | 2680 | 1547 | 1460 | 1410 | 2580 |

| Parameters | SUBSAMPLE 4 | | | | SUBSAMPLE 5 | | | | SUBSAMPLE 6 | | | |
|---|---|---|---|---|---|---|---|---|---|---|---|---|
| | Feed | Output | Middling | Concentrate | Feed | Output | Middling | Concentrate | Feed | Output | Middling | Concentrate |
| Weight (g) | 2684 | 1639 | 822 | 223 | 2649 | 1552 | 874 | 223 | 2765 | 1632 | 910 | 223 |
| Cu (ppm) | 1243 | 617 | 1040 | 6590 | 1046 | 381 | 1620 | 3420 | 1007 | 505 | 1280 | 3570 |
| Pb (ppm) | 515 | 277 | 293 | 3080 | 469 | 243 | 428 | 2200 | 415 | 309 | 285 | 1730 |
| Zn (ppm) | 1821 | 1720 | 1740 | 2870 | 1706 | 1480 | 1790 | 2950 | 1868 | 1940 | 1570 | 2566 |

| Parameters | SUBSAMPLE AVERAGE | | | |
|---|---|---|---|---|
| | Feed | Output | Middling | Concentrate |
| Weight (g) | 2703 | 1585 | 880 | 238 |
| Cu (ppm) | 1025 | 472 | 1155 | 4232 |
| Pb (ppm) | 455 | 271 | 293 | 2283 |
| Zn (ppm) | 1716 | 1622 | 1607 | 2728 |

TABLE 41

Cleaning coefficients with MGS in long-term trials

| Parameters | SUBSAMPLE 1 | | | Parameters | SUBSAMPLE 2 | | |
|---|---|---|---|---|---|---|---|
| | Feed | Output | Concentrate | | Feed | Output | Concentrate |
| Weight (g) | 1087 | 554 | 533 | weight (g) | 532 | 276 | 256 |
| Cu (ppm) | 955 | 489 | 1440 | Cu (ppm) | 936 | 506 | 1400 |
| Pb (ppm) | 679 | 467 | 900 | Pb (ppm) | 675 | 458 | 910 |
| Zn (ppm) | 3600 | 2100 | 5160 | Zn (ppm) | 3610 | 2090 | 5250 |

| Parameters | SUBSAMPLE 3 | | | Parameters | SUBSAMPLE 4 | | |
|---|---|---|---|---|---|---|---|
| | Feed | Output | Concentrate | | Feed | Output | Concentrate |
| Weight (g) | 356 | 182 | 174 | Weight (g) | 526 | 271 | 255 |
| Cu (ppm) | 917 | 494 | 1360 | Cu (ppm) | 927 | 502 | 1380 |
| Pb (ppm) | 685 | 469 | 911 | Pb (ppm) | 683 | 452 | 930 |
| Zn (ppm) | 3641 | 2140 | 5210 | Zn (ppm) | 3651 | 2100 | 5300 |

| Parameters | SUBSAMPLE 5 | | | Parameters | SUBSAMPLE 6 | | |
|---|---|---|---|---|---|---|---|
| | Feed | Output | Concentrate | | Feed | Output | Concentrate |
| Weight (g) | 507 | 266 | 241 | Weight (g) | 526 | 277 | 249 |
| Cu (ppm) | 1003 | 499 | 1560 | Cu (ppm) | 882 | 470 | 1340 |
| Pb (ppm) | 678 | 453 | 926 | Pb (ppm) | 656 | 436 | 900 |
| Zn (ppm) | 3651 | 2120 | 5340 | Zn (ppm) | 3518 | 2060 | 5140 |

| Parameters | SUBSAMPLE 7 | | | Parameters | SUBSAMPLE 8 | | |
|---|---|---|---|---|---|---|---|
| | Feed | Output | Concentrate | | Feed | Output | Concentrate |
| Weight (g) | 506 | 269 | 237 | Weight (g) | 1276 | 663 | 613 |
| Cu (ppm) | 891 | 469 | 1370 | Cu (ppm) | 882 | 486 | 1310 |
| Pb (ppm) | 658 | 428 | 920 | Pb (ppm) | 672 | 466 | 894 |
| Zn (ppm) | 3540 | 2060 | 5220 | Zn (ppm) | 3532 | 2110 | 5070 |

TABLE 41-continued

Cleaning coefficients with MGS in long-term trials

| Parameters | SUBSAMPLE AVERAGE | | |
|---|---|---|---|
| | Feed | Output | Concentrate |
| Weight (g) | 664.5 | 344.75 | 319.75 |
| Cu (ppm) | 924 | 490 | 1395 |
| Pb (ppm) | 673 | 454 | 911 |
| Zn (ppm) | 3593 | 2098 | 5211 |

TABLE 42

Mass data in long-term trials

| Section | sieved weight t[1] | Used weights t[1] |
|---|---|---|
| Primary sieving + 6.4 mm | 3.83 | 3.83 |
| Circuit jigs − 6.4 mm + 1.68 mm | 1.5 | 1.06 |
| Circuit spirals − 1.68 mm + 0.10 6 mm | 1.98 | 1.78 |
| Circuit MGS − 0.106 mm | 2.77 | 1.51 |
| Total | 10.08 | 8.18 |

[1]t: metric ton

TABLE 43

Operating conditions for trials presented in Tables 39–41

| Jig Denver double compartment | Reichert MG4 spiral | MGS Mozley separator |
|---|---|---|
| Feed: 2 kg/min | Feed 25 kg/min | Feed 3 l/min |
| Washing water: 3 l/min | Pulp water: 70 l/min | Rotation speed: 250 rpm |
| Dilution water: 14 l/min | Washing water: 0 l/min | Washing: 3 l/min |
| % solid: 10.5 % | % solid: 26.32% | Angle: 6° |
| Frequency: 330 cp/min | Blade positions: concentrate 1: 6 | Frequency: 5 cps |
| Amplitude: 16 mm | Blade positions: concentrate 2: 10 | Amplitude: 15 mm |
| | Blade positions: Middling: 14 | % solid: 30% |
| | | Pulp mass density: 1.2 g/cc |

Although the invention has been described above with respect to a few representative examples and drawings, it will be evident in the person skilled in the art that it may be modified and refined in various ways. It is therefore wished to have it understood that the present invention should not be limited in scope, except by the terms of the following claims:

What is claimed is:

1. A method for decontaminating soil containing inorganic contaminants having a degree of liberation of at least 60%, comprising the steps of:
    a) removing from a coarse fraction at least a portion of inorganic contaminants in particulate form contained therein with a jig to produce a treated coarse fraction,
    b) removing from an intermediate fraction at least a portion of inorganic contaminants in particulate form contained therein with a to produce a treated intermediate fraction; and
    c) removing from a fine fraction at least a portion of inorganic contaminants in particulate form contained therein with a multi-gravity separator to produce a treated fine fraction,
    whereby the combined treated coarse, intermediate and fine fractions are impoverished in inorganic contaminants.

2. A method as defined in claim 1, further comprising prior to step a), a step of removing a non-contaminated portion of the coarse fraction.

3. A method as defined in claim 1, wherein the coarse fraction consists essentially in particles larger than or equal to 1.7 mm.

4. A method as defined in claim 1, wherein the intermediate fraction consists essentially in particles having a size within the range of 38 μm to 1.7 mm, inclusively.

5. A method as defined in claim 1, wherein the fine fraction consists essentially in particles of a size smaller than or equal to 106 μm.

6. A method as defined in claim 1, wherein the coarse fraction consists essentially in particles having a size within the range 1.7 mm and 6.4 mm, inclusively; wherein the intermediate fraction consists essentially in particles having a size within the range of 106 μm to 1.7 mm, inclusively; and wherein the fine fraction consists essentially in particles having a size equal to or smaller than 106 μm.

7. A method as defined in claim 6, further comprising a step of removing from an organically contaminated portion of the soil at least a portion of the organic contaminants contained therein with an attrition cell.

8. A method as defined in claim 6, wherein the step of removing at least a portion of organic contaminants comprises the substeps of
    a) identifying the at least one organically contaminated grain-size fraction;
    b) isolating the at least one contaminated fraction identified in step a);
    c) washing the at least one contaminated fraction isolated in step b) in an attrition cell, whereby at least a portion of organic contaminants contained therein are solubilised in a liquid phase;
    d) separating from a solid phase, the liquid phase of step c) containing solubilised organic contaminants; and
    e) flocculating at least a portion of the solubilised organic contaminants to produce a flocculated phase.
    whereby the solid phase of step d) is soil impoverished in organic contaminants.

9. A method for decontaminating soil containing inorganic contaminants having a degree of liberation of at least 60%, comprising the steps of:
    a) screening the soil to remove a non-contaminated fraction of the soil, wherein said non-contaminated fraction consists essentially in particles larger than those of a coarse fraction;
    b) screening the undersize from step a) to obtain said coarse fraction, and a coarse fraction undersize;

c) removing at least a portion of the inorganic contaminants from the coarse fraction, with a jig;

d) screening the coarse fraction undersize from step b) to obtain an intermediate fraction, and an intermediate fraction undersize;

e) removing at least a portion of the inorganic contaminants from the intermediate fraction, with a spiral;

f) screening the intermediate fraction undersize from step d) to obtain a fine fraction; and g) removing at least a portion of the inorganic contaminants from the fine fraction, with a multi-gravity separator.

10. A method as defined in claim 9, wherein the coarse fraction consists essentially in particles having a size within the range 1.7 mm and 6.4 mm, inclusively; wherein the intermediate fraction consists essentially in particles having a size within the range of 106 μm to 1.7 mm, inclusively; and wherein the fine fraction consists essentially in particles having a size equal to or smaller than 106 μm.

11. A method as defined in claim 9 further comprising a step of removing from an organically contaminated portion of the soil at least a portion of the organic contaminants contained therein with an attrition cell.

12. A method as defined in claim 10, further comprising a step of removing from an organically contaminated portion of the soil at least a portion of the organic contaminants contained therein with an attrition cell.

13. A method as defined in claim 12, wherein the step of removing at least a portion of organic contaminants comprises the substeps of a) identifying the at least one organically contaminated grain-size fraction;

b) isolating the at least one contaminated fraction identified in step a);

c) washing the at least one contaminated fraction isolated in step b) in an attrition cell, whereby at least a portion of organic contaminants contained therein are solubilised in a liquid phase;

d) separating from a solid phase the liquid phase of step c) containing solubilised organic contaminants; and e) flocculating at least a portion of the solubilised organic contaminants to produce a flocculated phase, whereby the solid phase of step d) is soil impoverished in organic contaminants.

14. A method as defined in claim 1 comprising obtaining said coarse fraction by a1) screening the soil to remove a non-contaminated fraction of the soil, wherein said non-contaminated fraction consists essentially in particles larger than those of the coarse fraction; and b1) screening the undersize from a1) to obtain said coarse fraction, and a coarse fraction undersize; and obtaining said intermediate fraction by screening the coarse fraction undersize from b1) to obtain said intermediate fraction and said fine fraction.

15. A method as defined in claim 14, wherein the coarse fraction consists essentially in particles having a size within the range 1.7 mm and 6.4 mm, inclusively; wherein the intermediate fraction consists essentially in particles having a size within the range of 106 μm to 1.7 mm, inclusively; and wherein the fine fraction consists essentially in particles having a size equal to or smaller than 106 μm.

16. A method as defined in claim 14 further comprising a step of removing from an organically contaminated portion of the soil at least a portion of the organic contaminants contained therein with an attrition cell.

17. A method as defined in claim 16, further comprising a step of removing from an organically contaminated portion of the soil at least a portion of the organic contaminants contained therein with an attrition cell.

18. A method as defined in claim 17, wherein the step of removing at least a portion of organic contaminants comprises the substeps of a) identifying the at least one organically contaminated grain-size fraction;

b) isolating the at least one contaminated fraction identified in step a);

c) washing the at least one contaminated fraction isolated in step b) in an attrition cell, whereby at least a portion of organic contaminants contained therein are solubilised in a liquid phase;

d) separating from a solid phase the liquid phase of step c) containing solubilised organic contaminants; and e) flocculating at least a portion of the solubilised organic contaminants to produce a flocculated phase, whereby the solid phase of step d) is soil impoverished in organic contaminants.

19. A method as defined in claim 1 wherein said coarse fraction has been obtained by a1) screening the soil to remove a non-contaminated fraction of the soil, wherein said non-contaminated fraction consists essentially in particles larger than those of the coarse fraction; and b1) screening the undersize from a1) to obtain said coarse fraction, and a coarse fraction undersize; wherein said intermediate fraction has been obtained by c1) screening the coarse fraction undersize from b1) to obtain said intermediate fraction, and an intermediate fraction undersize; and wherein said fine fraction has been obtained by screening the intermediate fraction undersize from c1) to obtain said fine fraction.

20. A method as defined in claim 19, wherein the coarse fraction consists essentially in particles having a size within the range 1.7 mm and 6.4 mm, inclusively; wherein the intermediate fraction consists essentially in particles having a size within the range of 106 μm to 1.7 mm, inclusively; and wherein the fine fraction consists essentially in particles having a size equal to or smaller than 106 μm.

* * * * *